US011898052B2

(12) United States Patent
Hiramatsu et al.

(10) Patent No.: US 11,898,052 B2
(45) Date of Patent: Feb. 13, 2024

(54) WATER-BASED COATING COMPOSITION

(71) Applicant: KANSAI PAINT CO., LTD., Hyogo (JP)

(72) Inventors: Ryusuke Hiramatsu, Kanagawa (JP); Yosuke Morishita, Kanagawa (JP); Daisuke Furuya, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 257 days.

(21) Appl. No.: 17/429,145

(22) PCT Filed: Jan. 15, 2020

(86) PCT No.: PCT/JP2020/001113

§ 371 (c)(1),
(2) Date: Aug. 6, 2021

(87) PCT Pub. No.: WO2020/162126

PCT Pub. Date: Aug. 13, 2020

(65) Prior Publication Data

US 2022/0162473 A1 May 26, 2022

(30) Foreign Application Priority Data

Feb. 8, 2019 (JP) ................................ 2019-021119
Apr. 10, 2019 (JP) ................................ 2019-074877

(51) Int. Cl.
*C09D 175/08* (2006.01)
*C09D 7/20* (2018.01)
*B05D 5/06* (2006.01)
*B05D 7/00* (2006.01)

(52) U.S. Cl.
CPC ............ *C09D 175/08* (2013.01); *B05D 5/06* (2013.01); *B05D 7/572* (2013.01); *C09D 7/20* (2018.01)

(58) Field of Classification Search
None
See application file for complete search history.

(56) References Cited

U.S. PATENT DOCUMENTS

2004/0228975 A1 11/2004 Takesako et al.
2006/0121204 A1 6/2006 Nakae et al.
2006/0188654 A1* 8/2006 Onoyama ............ C09C 1/3676 524/497
2009/0111935 A1* 4/2009 Fujii .................. C08G 18/758 524/507
2012/0107619 A1* 5/2012 Kitagawa ............ C09D 133/12 524/507
2015/0004401 A1 1/2015 Kojima et al.
2015/0064476 A1 3/2015 Kanda et al.
2015/0225596 A1 8/2015 Kitagawa et al.
2018/0133755 A1 5/2018 Muramoto et al.
2018/0230327 A1* 8/2018 Kanda ............... C08G 18/3206
2019/0077985 A1 3/2019 Kanda et al.
2020/0048492 A1 2/2020 Imai et al.

FOREIGN PATENT DOCUMENTS

CA 2768557 A1 1/2011
JP 2004-358462 A 12/2004
JP 2018-075552 A 5/2018
WO 2013129136 A1 9/2013
WO 2013151050 A1 10/2013
WO 2005075587 A1 8/2015
WO 2017038306 A1 3/2017
WO 2017164072 A1 9/2017
WO 2018135209 A1 7/2018

OTHER PUBLICATIONS

English Translation of International Search Report for PCT/JP2020/001113 dated Mar. 31, 2020.

* cited by examiner

*Primary Examiner* — Francisco W Tschen
(74) *Attorney, Agent, or Firm* — MILLEN, WHITE, ZELANO & BRANIGAN, P.C.; Csaba Henter

(57) ABSTRACT

Provided is a water-based coating composition capable of forming a multilayer coating film having an excellent finished appearance and having excellent storage stability. A water-based coating composition to be used as a water-based first colored coating (X) in a 3-coat-1-bake multilayer coating formation method which sequentially applies a water-based first colored coating (X), a water-based second colored coating (Y), and a clear coating (Z) and heats and cures the obtained three-layer multilayer coating film simultaneously, wherein the water-based coating composition contains at least one resin selected from acrylic resins (A) and polyester resins (B), a curing agent (C), and urethane resin particles (D) obtained from structural components including a polyisocyanate component (d1) containing at least one diisocyanate (d1-1) selected from xylylene diisocyanate and hydrogenated xylylene diisocyanate and a polyol component (d2).

14 Claims, No Drawings

WATER-BASED COATING COMPOSITION

The present invention relates to a water-based coating composition, and more specifically, a water-based coating composition to be used as a water-based first colored coating material in a method for forming a multilayer coating film by a 3-coat, 1-bake system which includes coating a water-based first colored coating material, a water-based second colored coating material and a clear coating material in that order on an article to be coated, and simultaneously heat curing the obtained 3-layer multilayer coating film.

BACKGROUND

With ever increasing attention to global environmental issues in recent years, environmentally-friendly improvements continue to be implemented in production processes in industry, including the automotive industry. Automobile production steps are associated with problems including global warming, as well as discharge of industrial waste and volatile organic compounds (VOC), with most VOCs being emitted during the coating steps, and therefore measures to counter these problems are considered to be an urgent issue.

Methods of forming coating films for automobile bodies include a widely employed method of forming a multilayer coating film by a 3-coat, 2-bake (3C2B) system in which an electrodeposition coating is formed on an article to be coated, after which the procedure of intercoat material application→bake curing→aqueous base coating material application→preheating→clear coating material application→bake curing is carried out, but in recent years from the viewpoint of achieving energy savings and reducing VOC emission, it has also been attempted to employ 3-coat, 1-bake (3C1B) systems that use an aqueous intercoat material as the intercoat material and eliminate the baking and curing step following application of the aqueous intercoat material, wherein electrodeposition coating is carried out on an article to be coated, and then the procedure of aqueous intercoat material application→preheating→aqueous base coating material application→preheating→clear coating material application→bake curing is carried out.

In 3-coat, 1-bake systems, however, coating film layer mixing takes place between the intercoat layer and base coat layer, which becomes a problem since a multilayer coating film with excellent finished appearance cannot be obtained.

PTL 1 discloses obtaining a multilayer coating film exhibiting excellent coated film appearance by using an aqueous intercoat material composition that contains an aqueous dispersion-type polyurethane composition comprising a polyisocyanate component (a1) comprising diisocyanate as an essential component, a polyol component (a2) comprising a polycarbonate diol with an average molecular weight of 500 to 5000 and a carboxyl group-containing diol as essential components, an amine component (a3) comprising a monoamine compound as an essential component, a carboxyl group-neutralizer component (a4) and water (a5). However, this multilayer coating film also has an unsatisfactory finished appearance.

PTL 2 discloses that it is possible to form a multilayer coating film with excellent surface smoothness while effectively preventing phase mixing between the intercoating film and base coating film, by a method of forming a multilayer coating film comprising (1) a step of providing an article to be coated having an electrodeposition coating formed on it; (2) a step of coating an aqueous intercoat material onto the electrodeposition coating to form an intercoating film; (3) a step of consecutively coating an aqueous base coating material and a clear coating material in a wet-on-wet manner on the intercoating film without curing the intercoating film, to form a base coating film and clear coating film; and (4) a step of simultaneously bake curing the intercoating film, base coating film and clear coating film, wherein the intercoating film formed from the aqueous intercoat material has a coating water absorption rate of 10% or lower and a coating water elution rate of 5% or lower, and the aqueous intercoat material contains an acrylic resin emulsion with a glass transition temperature of −50 to 20° C., an acid value of 2 to 60 mgKOH/g and a hydroxyl value of 10 to 120 mgKOH/g, a urethane resin emulsion with an acid value of 5 to 50 mgKOH/g, and a curing agent. However, this multilayer coating film also has an unsatisfactory finished appearance.

Recently it has become desirable to eliminate preheating after aqueous intercoat material application in a 3-coat, 1-bake (3C1B) system, from the viewpoint of further increasing energy savings.

On the other hand, increasing viscosity or precipitation that may occur during storage of a coating material can hamper its application, and therefore storage stability is also required for coating materials.

CITATION LIST

Patent Literature

[PTL 1] International Patent Publication No. 2005/075587

[PTL 2] Japanese Unexamined Patent Publication No. 2004-358462

SUMMARY

Technical Problem

It is an object of the invention to provide a water-based coating composition to be used as a water-based first colored coating material in a method for forming a multilayer coating film by a 3-coat, 1-bake system which includes coating a water-based first colored coating material, a water-based second colored coating material and a clear coating material in that order on an article to be coated, and simultaneously heat curing the obtained 3-layer multilayer coating film, wherein the water-based coating composition has excellent storage stability and can form a multilayer coating film with an excellent finished appearance.

Solution to Problem

As a result of much avid research with the object stated above, the present inventors have completed this invention upon finding that the object can be achieved if a water-based coating composition is used as a water-based first colored coating material (X) in a method for forming a multilayer coating film by a 3-coat, 1-bake system, which includes coating the water-based first colored coating material (X), a water-based second colored coating material (Y) and a clear coating material (Z) in that order on an article to be coated, and simultaneously heat curing the obtained 3-layer multilayer coating film, and the water-based coating composition comprises at least one type of resin selected from among acrylic resin (A) and polyester resin (B), a curing agent (C), and urethane resin particles (D) obtained from a constituent component including a polyisocyanate component (d1) comprising at least one type of diisocyanate (d1-1) selected from among xylylene diisocyanates and hydrogenated xylylene diisocyanates, and a polyol component (d2).

According to the invention it is possible to provide a water-based coating composition and a method for forming a multilayer coating film, encompassing the following embodiments.

1. A water-based coating composition to be used as a water-based first colored coating material (X) in a method for forming a multilayer coating film in which the following steps (1) to (4) are carried out in order:

step (1): a step of applying the water-based first colored coating material (X) onto an article to be coated to form a first colored coating film, step (2): a step of applying a water-based second colored coating material (Y) onto the first colored coating film formed in step (1), to form a second colored coating film, step (3): a step of applying a clear coating material (Z) onto the second colored coating film formed in step (2) to form a clear coating film, and step (4): a step of heat curing the first colored coating film, the second colored coating film and the clear coating film formed in steps (1) to (3) all at once, wherein the water-based coating composition comprises:

at least one type of resin selected from among acrylic resin (A) and polyester resin (B), a curing agent (C), and urethane resin particles (D) obtained from a constituent component including a polyisocyanate component (d1) comprising at least one type of diisocyanate (d1-1) selected from among xylylene diisocyanates and hydrogenated xylylene diisocyanates, and a polyol component (d2).

2. The water-based coating composition according to 1., wherein the polyol component (d2) comprises a polyether polyol (d2-1) and a polycarbonate polyol (d2-2).

3. The water-based coating composition according to 2., wherein the number-average molecular weight of the polyether polyol (d2-1) is 1600 to 4000.

4. The water-based coating composition according to 2. or 3., wherein the number-average molecular weight of the polycarbonate polyol (d2-2) is 1600 to 4000.

5. The water-based coating composition according to any one of 2. to 4., wherein the content ratio of the polyether polyol (d2-1) and the polycarbonate polyol (d2-2) in the polyol component (d2) is 95/5 to 50/50, as the mass ratio of polyether polyol (d2-1)/polycarbonate polyol (d2-2).

6. The water-based coating composition according to any one of 1. to 5., wherein the urethane resin particles (D) are urethane resin particles (D') having a core-shell structure.

7. The water-based coating composition according to 6., wherein the polyisocyanate component (I-d1) composing the core sections of the urethane resin particles (D') having a core-shell structure comprises at least one type of diisocyanate (d1-1) selected from among xylylene diisocyanates and hydrogenated xylylene diisocyanates.

8. The water-based coating composition according to 6. or 7., wherein the polyol component (I-d2) composing the core sections of the urethane resin particles (D') having a core-shell structure comprises the polyether polyol (d2-1), and the polyol component (II-d2) composing the shell sections comprises the polycarbonate polyol (d2-2).

9. A method for forming a multilayer coating film in which the following steps (1) to (4) are carried out in order:

step (1): a step of applying a water-based first colored coating material (X) onto an article to be coated to form a first colored coating film, step (2): a step of applying a water-based second colored coating material (Y) onto the first colored coating film formed in step (1), to form a second colored coating film, step (3): a step of applying a clear coating material (Z) onto the second colored coating film formed in step (2) to form a clear coating film, and step (4): a step of heat curing the first colored coating film, the second colored coating film and the clear coating film formed in steps (1) to (3) all at once, wherein the water-based first colored coating material (X) is a water-based coating composition comprising:

at least one type of resin selected from among acrylic resin (A) and polyester resin (B), a curing agent (C), and urethane resin particles (D) obtained from a constituent component including a polyisocyanate component (d1) comprising at least one type of diisocyanate (d1-1) selected from among xylylene diisocyanates and hydrogenated xylylene diisocyanates, and a polyol component (d2).

10. The method for forming a multilayer coating film according to 9., wherein the polyol component (d2) comprises a polyether polyol (d2-1) and a polycarbonate polyol (d2-2).

11. The method for forming a multilayer coating film according to 10., wherein the number-average molecular weight of the polyether polyol (d2-1) is 1600 to 4000.

12. The method for forming a multilayer coating film according to 10. or 11., wherein the number-average molecular weight of the polycarbonate polyol (d2-2) is 1600 to 4000.

13. The method for forming a multilayer coating film according to any one of 10. to 12., wherein the content ratio of the polyether polyol (d2-1) and the polycarbonate polyol (d2-2) in the polyol component (d2) is 95/5 to 50/50, as the mass ratio of polyether polyol (d2-1)/polycarbonate polyol (d2-2).

14. The method for forming a multilayer coating film according to any one of 9. to 13., wherein the urethane resin particles (D) are urethane resin particles (D') having a core-shell structure.

15. The method for forming a multilayer coating film according to 14., wherein the polyisocyanate component (I-d1) composing the core sections of the urethane resin particles (D') having a core-shell structure comprises at least one type of diisocyanate (d1-1) selected from among xylylene diisocyanates and hydrogenated xylylene diisocyanates.

16. The method for forming a multilayer coating film according to 14. or 15., wherein the polyol component (I-d2) composing the core sections of the urethane resin particles (D') having a core-shell structure comprises the polyether polyol (d2-1), and the polyol component (II-d2) composing the shell sections comprises the polycarbonate polyol (d2-2).

Advantageous Effects of Invention

With the water-based coating composition according to the invention it is possible to form a multilayer coating film with an excellent finished outer appearance, by a 3-coat, 1-bake system in which a water-based first colored coating material, a water-based second colored coating material and a clear coating material are applied in that order onto an article to be coated and the obtained 3-layer multilayer coating film is simultaneously heat cured. In particular it is possible to form a multilayer coating film having an excellent finished appearance even in a 3-coat, 1-bake system with reduced preheating after application of the water-based first colored coating material. The water-based coating composition of the invention also has excellent storage stability.

DESCRIPTION OF EMBODIMENTS

The water-based coating composition and method for forming a multilayer coating film of the invention will now be explained in greater detail.

Water-Based Coating Composition

A water-based coating composition of the invention (hereunder also referred to simply as "coating material") is a water-based coating composition to be used as a water-based first colored coating material (X) in a method for forming a multilayer coating film in which the following steps (1) to (4) are carried out in order:

step (1): a step of applying the water-based first colored coating material (X) onto an article to be coated to form a first colored coating film, step (2): a step of applying a water-based second colored coating material (Y) onto the first colored coating film formed in step (1), to form a second colored coating film, step (3): a step of applying a clear coating material (Z) onto the second colored coating film formed in step (2) to form a clear coating film, and step (4): a step of heat curing the first colored coating film, the second colored coating film and the clear coating film formed in steps (1) to (3) all at once, wherein the water-based coating composition comprises at least one type of resin selected from among acrylic resin (A) and polyester resin (B), a curing agent (C), and urethane resin particles (D) obtained from a constituent component including a polyisocyanate component (d1) comprising at least one type of diisocyanate (d1-1) selected from among xylylene diisocyanates and hydrogenated xylylene diisocyanates, and a polyol component (d2).

For the present purpose, "water-based coating material" is a term used in contrast to "organic solvent-based coating material", and generally refers to a coating material having a coating film-forming resin or pigment dispersed and/or dissolved in water or a medium composed mainly of water (an aqueous medium). An organic solvent-based coating material is a coating material wherein the solvent used contains substantially no water, or wherein all or virtually all of the solvent used is an organic solvent.

Acrylic Resin (A)

The acrylic resin (A) used may be a water-soluble or water-dispersible acrylic resin which is conventionally known for use in water-based coating materials.

The acrylic resin (A) preferably has a crosslinkable functional group that can react with the curing agent (C). Examples of such crosslinkable functional groups include hydroxyl, carboxyl and epoxy groups, among which at least one is preferably a hydroxyl group. The acrylic resin (A) used is therefore preferably a hydroxyl group-containing acrylic resin (A1).

Hydroxyl Group-Containing Acrylic Resin (A1)

The hydroxyl group-containing acrylic resin (A1) can be produced, for example, by copolymerizing a hydroxyl group-containing polymerizable unsaturated monomer and another polymerizable unsaturated monomer that is copolymerizable with the hydroxyl group-containing polymerizable unsaturated monomer, by a known method such as, for example, a solution polymerization method in an organic solvent or an emulsion polymerization method in water.

The hydroxyl group-containing polymerizable unsaturated monomer is a compound having one or more hydroxyl and polymerizable unsaturated bonds in the molecule. Specific examples for the hydroxyl group-containing polymerizable unsaturated monomer include monoesterified products of (meth)acrylic acid and dihydric alcohols of 2 to 8 carbon atoms, such as 2-hydroxyethyl (meth)acrylate, 2-hydroxypropyl (meth)acrylate, 3-hydroxypropyl (meth)acrylate and 4-hydroxybutyl (meth)acrylate; ε-caprolactone-modified forms of the monoesterified products of (meth) acrylic acid and dihydric alcohols of 2 to 8 carbon atoms; N-hydroxymethyl (meth)acrylamide; and allyl alcohols; as well as (meth)acrylates having polyoxyethylene chains with hydroxyl groups at the molecular ends. However, monomers qualifying as "(xvii) polymerizable unsaturated monomers with an ultraviolet absorbing functional group" as mentioned below are to be defined as "other polymerizable unsaturated monomers that are copolymerizable with hydroxyl group-containing polymerizable unsaturated monomers", and are excluded from "hydroxyl group-containing polymerizable unsaturated monomers" for the invention, even if they are hydroxyl-containing monomers. These may be used either alone or in combinations of two or more.

Examples of other polymerizable unsaturated monomers that are copolymerizable with the hydroxyl group-containing polymerizable unsaturated monomer and that may be used include the following monomers (i) to (xx). These polymerizable unsaturated monomers may be used alone or in combinations of two or more.

(i) Alkyl or cycloalkyl (meth)acrylates: For example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth) acrylate, 2-ethylhexyl (meth)acrylate, nonyl (meth) acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate and cyclododecyl (meth)acrylate, tricyclodecanyl (meth)acrylate.

(ii) Polymerizable unsaturated monomers with isobornyl groups:Monomers such as isobornyl (meth)acrylate.

(iii) Polymerizable unsaturated monomers with adamantyl groups:Monomers such as adamantyl (meth)acrylate.

(iv) Polymerizable unsaturated monomers with tricyclodecenyl groups:Monomers such as tricyclodecenyl (meth)acrylate.

(v) Aromatic ring-containing polymerizable unsaturated monomers: Monomers such as benzyl (meth)acrylate, styrene, α-methylstyrene and vinyltoluene.

(vi) Polymerizable unsaturated monomers with alkoxysilyl groups:Monomers such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane.

(vii) Polymerizable unsaturated monomers with fluorinated alkyl groups:Monomers such as perfluoroalkyl (meth)acrylates such as perfluorobutylethyl (meth) acrylate and perfluorooctylethyl (meth)acrylate, and fluoroolefins.

(viii) Polymerizable unsaturated monomers with photopolymerizable functional groups such as a maleimide group.

(ix) Vinyl compounds: Compounds such as N-vinylpyrrolidone, ethylene, butadiene, chloroprene, vinyl propionate and vinyl acetate.

(x) Carboxyl group-containing polymerizable unsaturated monomers: Monomers such as (meth)acrylic acid, maleic acid, crotonic acid and β-carboxyethyl (meth) acrylate.

(xi) Nitrogen-containing polymerizable unsaturated monomers: Monomers such as (meth)acrylonitrile, (meth)acrylamide, N,N-dimethylaminoethyl (meth) acrylate, N,N-diethylaminoethyl (meth)acrylate, N,N-dimethylaminopropyl (meth)acrylamide, methylenebis (meth)acrylamide, ethylenebis(meth)acrylamide, and addition products of glycidyl (meth)acrylate and amine compound.

(xii) Polymerizable unsaturated monomers with two or more polymerizable unsaturated groups in the molecule: Monomers such as allyl (meth)acrylate, ethylene glycol di(meth)acrylate, 1,4-butanediol di(meth)acrylate, neopentyl glycol di(meth)acrylate and 1,6-hexanediol di(meth)acrylate.

(xiii) Epoxy group-containing polymerizable unsaturated monomers: Monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth) acrylate and allyl glycidyl ether.

(xiv) (Meth)acrylates having polyoxyethylene chains with alkoxy groups at the molecular ends.

(xv) Polymerizable unsaturated monomers with sulfonic acid groups:Monomers such as 2-acrylamide-2-methylpropanesulfonic acid, 2-sulfoethyl (meth)acrylate, allylsulfonic acid and 4-styrenesulfonic acid; and sodium salts and ammonium salts of these sulfonic acids.

(xvi) Polymerizable unsaturated monomers with phosphate groups:Monomers such as acid phosphooxyethyl (meth)acrylate, acid phosphooxypropyl (meth)acrylate, acid phosphooxypoly(oxyethylene)glycol (meth)acrylate and acid phosphooxypoly(oxypropylene)glycol (meth)acrylate.

(xvii) Polymerizable unsaturated monomers with ultraviolet absorbing functional groups: Monomer such as 2-hydroxy-4(3-methacryloyloxy-2-hydroxypropoxy) benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy) benzophenone and 2-[2-hydroxy-5-[2-(methacryloyloxy)ethyl]phenyl]-2H-benzotriazole.

(xviii) Light-stable polymerizable unsaturated monomers: Monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine and 1-crotonoyl-4-crotonoyloxy-2,2,6,6-tetramethylpiperidine.

(xix) Polymerizable unsaturated monomers with carbonyl groups: Monomer such as acrolein, diacetoneacrylamide, diacetonemethacrylamide, acetoacetoxyethyl methacrylate, formylstyrol and vinylalkyl ketones with 4 to 7 carbon atoms (for example, vinylmethyl ketone, vinylethyl ketone, vinylbutyl ketone).

(xx) Polymerizable unsaturated monomers with acid anhydride groups:Monomers such as maleic anhydride, itaconic anhydride and citraconic anhydride.

As used herein, "polymerizable unsaturated group" means an unsaturated group that can participate in radical polymerization. Examples of such polymerizable unsaturated groups include vinyl and (meth)acryloyl.

Also, as used herein, "(meth)acrylate" refers to acrylate or methacrylate. The term "(meth)acrylic acid" refers to acrylic acid or methacrylic acid. The term "(meth)acryloyl" refers to acryloyl or methacryloyl. The term "(meth)acrylamide" refers to acrylamide or methacrylamide.

The use proportion of the hydroxyl group-containing polymerizable unsaturated monomer when producing the hydroxyl group-containing acrylic resin (A1) is preferably 1 to 50 mass %, more preferably 2 to 40 mass % and even more preferably 3 to 30 mass %, based on the total amount of the monomer components.

From the viewpoint of the curability, chipping resistance, adhesiveness and finished appearance of the obtained coating film, the hydroxyl group-containing acrylic resin (A1) has a hydroxyl value of preferably 1 to 200 mgKOH/g, more preferably 2 to 180 mgKOH/g and even more preferably 5 to 150 mgKOH/g.

Also, from the viewpoint of the storage stability of the coating material and the water resistance of the obtained coating film, the hydroxyl group-containing acrylic resin (A1) has an acid value of preferably 1 to 150 mgKOH/g, more preferably 5 to 100 mgKOH/g and even more preferably 5 to 80 mgKOH/g.

When the water-based coating composition contains the hydroxyl group-containing acrylic resin (A1), the content of the hydroxyl group-containing acrylic resin (A1) is preferably 2 to 70 mass %, more preferably 5 to 50 mass % and even more preferably 10 to 40 mass %, based on the resin solid content of the water-based coating composition.

Polyester Resin (B)

The polyester resin (B) used may be a water-soluble or water-dispersible polyester resin which is conventionally known for use in water-based coating materials.

The polyester resin (B) preferably has a crosslinkable functional group that can react with the curing agent (C). Examples of such crosslinkable functional groups include hydroxyl, carboxyl and epoxy groups, among which at least one is preferably a hydroxyl group. The polyester resin (B) used is therefore preferably a hydroxyl group-containing polyester resin (B1).

Hydroxyl Group-Containing Polyester Resin (B1)

The hydroxyl group-containing polyester resin (B1) can generally be produced by esterification reaction or transesterification reaction between an acid component and an alcohol component.

The acid component used may be a compound that is commonly used as an acid component for production of polyester resins. Examples of such acid components include aliphatic polybasic acids, alicyclic polybasic acids and aromatic polybasic acids.

The aliphatic polybasic acid will generally be an aliphatic compound having two or more carboxyl groups in the molecule, an acid anhydride of such an aliphatic compound, or an ester of such an aliphatic compound. Examples for the aliphatic polybasic acid include aliphatic polybasic carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid, citric acid and butanetetracarboxylic acid; anhydrides of such aliphatic polybasic carboxylic acids; and esterified products of such aliphatic polybasic carboxylic acids with lower alkyl of about 1 to 4 carbon atoms. The aliphatic polybasic acid used may be one type or a combination of two or more types.

The aliphatic polybasic acid used is preferably adipic acid and/or adipic anhydride, from the viewpoint of smoothness of the coating film that is to be obtained.

The alicyclic polybasic acid will generally be a compound having one or more alicyclic structures and two or more carboxyl groups in the molecule, or an acid anhydride of such a compound or an esterified form of such a compound. An alicyclic structure is mainly a 4- to 6-membered cyclic structure. Examples of alicyclic polybasic acids include alicyclic polybasic carboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid and 1,3,5-cyclohexanetricarboxylic acid; anhydrides of these alicyclic polybasic carboxylic acids; and esterified products of these alicyclic polybasic carboxylic acids with lower alkyl of about 1 to 4 carbon atoms. The alicyclic polybasic acid used may be one type or a combination of two or more types.

From the viewpoint of smoothness of the coating film that is to be obtained, the alicyclic polybasic acid used is preferably 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid or 4-cyclohexene-1,2-dicarboxylic anhydride, among which 1,2-cyclohexanedicarboxylic acid and/or 1,2-cyclohexanedicarboxylic anhydride are more preferably used.

An aromatic polybasic acid is generally an aromatic compound having two or more carboxyl groups in the molecule, an acid anhydride of such an aromatic compound or an esterified form of such an aromatic compound, and examples include aromatic polybasic carboxylic acids such as phthalic acid, isophthalic acid, terephthalic acid, naphthalenedicarboxylic acid, 4,4'-biphenyldicarboxylic acid, trimellitic acid and pyromellitic acid; anhydrides of such aromatic polybasic carboxylic acids; and esterified products of such aromatic polybasic carboxylic acids with lower alkyl of about 1 to 4 carbon atoms. The aromatic polybasic acid used may be one type or a combination of two or more types.

The aromatic polybasic acid used is preferably phthalic acid, phthalic anhydride, isophthalic acid, trimellitic acid or trimellitic anhydride.

Acid components other than the aforementioned aliphatic polybasic acids, alicyclic polybasic acids and aromatic polybasic acids may also be used. Such acid components are not particularly restricted, and examples include fatty acids such as coconut fatty acid, cottonseed oil fatty acid, hempseed oil fatty acid, rice bran oil fatty acid, fish oil fatty acid, tall oil fatty acid, soybean oil fatty acid, linseed oil fatty acid, China wood oil fatty acid, rapeseed oil fatty acid, castor oil fatty acid, dehydrated castor oil fatty acid and safflower oil fatty acid; monocarboxylic acids such as lauric acid, myristic acid, palmitic acid, stearic acid, oleic acid, linoleic acid, linolenic acid, benzoic acid, p-tert-butylbenzoic acid, cyclohexanoic acid and 10-phenyloctadecanoic acid; and hydroxycarboxylic acids such as lactic acid, 3-hydroxybutanoic acid and 3-hydroxy-4-ethoxybenzoic acid. These acid components may be used either alone or in combinations of two or more.

As the alcohol component there may be suitably used a polyhydric alcohol having two or more hydroxyl groups in the molecule. Examples of polyhydric alcohols include dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, neopentyl glycol hydroxypivalate ester, hydrogenated bisphenol A, hydrogenated bisphenol F and dimethylolpropionic acid; polylactone diols with lactone compounds such as ε-caprolactone added to these dihydric alcohols; ester diol compounds such as bis(hydroxyethyl) terephthalate; polyether diol compounds such as bisphenol A alkylene oxide addition products, polyethylene glycol, polypropylene glycol and polybutylene glycol; trihydric and greater alcohols such as glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol and mannitol; polylactone polyol compounds with lactone compounds such as ε-caprolactone added to these trihydric and greater alcohols; and fatty acid esterified glycerin.

Alcohol components other than the aforementioned polyhydric alcohols may also be used. Such alcohol components are not particularly restricted, and examples include monoalcohols such as methanol, ethanol, propyl alcohol, butyl alcohol, stearyl alcohol and 2-phenoxyethanol; and alcohol compounds obtained by reacting acids with monoepoxy compounds such as propylene oxide, butylene oxide or "CARDURA E10P" (trade name of Hexion, glycidyl ester of synthetic highly-branched saturated fatty acid).

The method for producing the hydroxyl group-containing polyester resin is not particularly restricted, and it may be a common method. For example, a hydroxyl group-containing polyester resin can be produced by a method of heating the acid component and the alcohol component under a nitrogen stream at about 150 to 250° C. for about 5 to 10 hours, for esterification reaction or transesterification reaction between the acid component and alcohol component.

When the acid component and alcohol component are subjected to esterification reaction or transesterification reaction, they may be added all at once to the reactor, or one or both may be added in separate portions. Alternatively, after the hydroxyl group-containing polyester resin has first been synthesized, an acid anhydride may be reacted with the obtained hydroxyl group-containing polyester resin for half-esterification, to obtain a carboxyl group- and hydroxyl group-containing polyester resin. Also alternatively, after a carboxyl group-containing polyester resin has first been synthesized, the alcohol component may be added to obtain a hydroxyl group-containing polyester resin.

During the esterification or transesterification reaction, a known catalyst such as dibutyltin oxide, antimony trioxide, zinc acetate, manganese acetate, cobalt acetate, calcium acetate, lead acetate, tetrabutyl titanate or tetraisopropyl titanate may be used as a catalyst for acceleration of the reaction.

The hydroxyl group-containing polyester resin may also be modified with a fatty acid, monoepoxy compound, polyisocyanate compound or acrylic resin either during or after preparation of the resin.

Examples as fatty acids that may be suitably used include coconut fatty acid, cottonseed oil fatty acid, hempseed oil fatty acid, rice bran oil fatty acid, fish oil fatty acid, tall oil fatty acid, soybean oil fatty acid, linseed oil fatty acid, China wood oil fatty acid, rapeseed oil fatty acid, castor oil fatty acid, dehydrated castor oil fatty acid and safflower oil fatty acid, and a preferred example for the monoepoxy compound is "CARDURA E10P" (trade name of Hexion, glycidyl ester of synthetic highly-branched saturated fatty acid).

Examples for the polyisocyanate compound include organic polyisocyanates, such as aliphatic diisocyanate compounds such as lysine diisocyanate, hexamethylene diisocyanate and trimethylhexane diisocyanate; alicyclic diisocyanate compounds such as hydrogenated xylylene diisocyanate, isophorone diisocyanate, methylcyclohexane-2,4-diisocyanate, methylcyclohexane-2,6-diisocyanate, 4,4'-methylenebis(cyclohexylisocyanate) and 1,3-(isocyanatomethyl)cyclohexane; aromatic diisocyanate compounds such as tolylene diisocyanate, xylylene diisocyanate and diphenylmethane diisocyanate; and trivalent and greater polyisocyanates such as lysine triisocyanate; as well as addition products of these organic polyisocyanates with polyhydric alcohols, low molecular weight polyester resins or water; and cyclized polymers formed between these organic polyisocyanates (for example, isocyanurates) and biuret-type addition products. These polyisocyanate compounds may be used alone or in mixtures of two or more.

The method used to modify the hydroxyl group-containing polyester resin with an acrylic resin may be a known method, and for example, it may be a method of polymerizing a mixture of a polymerizable unsaturated group-containing polyester resin and a polymerizable unsaturated monomer, or a method of reacting a hydroxyl group-containing polyester resin with an acrylic resin.

The hydroxyl group-containing polyester resin (B1) has a hydroxyl value preferably of 1 to 250 mgKOH/g, more preferably 2 to 200 mgKOH/g and even more preferably 5 to 200 mgKOH/g.

When the hydroxyl group-containing polyester resin (B1) also has a carboxyl group, the acid value is preferably 1 to 150 mgKOH/g, more preferably 2 to 100 mgKOH/g and even more preferably 2 to 80 mgKOH/g.

The weight-average molecular weight of the hydroxyl group-containing polyester resin (B1) is preferably 3,000 to 100,000, more preferably 4,000 to 50,000 and even more preferably 5,000 to 30,000.

As used herein, the average molecular weight is the value calculated from a chromatogram measured by gel permeation chromatography based on the molecular weight of standard polystyrene. An "HLC8120GPC" apparatus (product of Tosoh Corp.) was used for the gel permeation chromatography. Four columns were used, namely "TSKgel G-4000HXL", "TSKgel G-3000HXL", "TSKgel G-2500HXL" and "TSKgel G-2000HXL" (all trade names of Tosoh Corp.), with the following conditions: mobile phase: tetrahydrofuran, measuring temperature: 40° C., flow rate: 1 mL/min, detector: RI.

When the water-based coating composition contains the hydroxyl group-containing polyester resin (B1), the content of the hydroxyl group-containing polyester resin (B1) is preferably 2 to 70 mass %, more preferably 5 to 50 mass % and even more preferably 10 to 40 mass %, based on the resin solid content of the water-based coating composition.

Curing Agent (C)

The curing agent (C) is a compound that can react with the crosslinkable functional groups in the acrylic resin (A) and polyester resin (B) to cure the water-based first colored coating material (X). The curing agent (C) may be used either alone or in combinations of two or more.

The curing agent (C) may be, for example, an amino resin, polyisocyanate compound, blocked polyisocyanate compound, epoxy group-containing compound, carboxyl group-containing compound, carbodiimide group-containing compound, hydrazide group-containing compound or semicarbazide group-containing compound.

From the viewpoint of the water resistance, chipping resistance and adhesiveness of the formed multilayer coating film and the storage stability of the coating material, particularly preferred compounds are amino resins (C1), polyisocyanate compounds (C2) and blocked polyisocyanate compounds (C3) that can react with hydroxyl groups, and carbodiimide group-containing compounds that can react with carboxyl groups, among which amino resins (C1), polyisocyanate compounds (C2) and blocked polyisocyanate compounds (C3) are more preferred and amino resins (C1) and blocked polyisocyanate compounds (C3) are especially preferred.

The amino resin (C1) used may be a partially methylolated amino resin or totally methylolated amino resin, obtained by reacting an amino component and an aldehyde component. Examples of such amino components include melamine, urea, benzoguanamine, acetoguanamine, steroguanamine, spiroguanamine and dicyandiamide. Aldehyde components include formaldehyde, paraformaldehyde, acetaldehyde and benzaldehyde.

Also, the methylol groups in the methylolated amino resin may be partially or completely etherified with a suitable alcohol. Examples of alcohols to be used for the etherification include methyl alcohol, ethyl alcohol, n-propyl alcohol, isopropyl alcohol, n-butyl alcohol, isobutyl alcohol, 2-ethyl-1-butanol and 2-ethyl-1-hexanol.

The amino resin is preferably a melamine resin. Particularly preferred are methyl etherified melamine resins having a methylol group of a partially or completely methylolated melamine resin partially or completely etherified with methyl alcohol, butyl etherified melamine resins having a methylol group of a partially or completely methylolated melamine resin partially or completely etherified with butyl alcohol, and methyl-butyl mixed etherified melamine resins having methylol groups of a partially or completely methylolated melamine resin partially or completely etherified with methyl alcohol and butyl alcohol, among which methyl-butyl mixed etherified melamine resins are more preferred.

The melamine resin has a weight-average molecular weight of preferably 400 to 6,000, more preferably 500 to 4,000 and even more preferably 600 to 3,000.

The melamine resin used may be a commercial product. Examples of trade names of commercial products include "CYMEL 202", "CYMEL 203", "CYMEL 238", "CYMEL 250", "CYMEL 251", "CYMEL 303", "CYMEL 323", "CYMEL 324", "CYMEL 325", "CYMEL 327", "CYMEL 350", "CYMEL 385", "CYMEL 1156", "CYMEL 1158", "CYMEL 1116" and "CYMEL 1130" (all products of Allnex, Japan), and "U-VAN 120", "U-VAN 20HS", "U-VAN 20SE60", "U-VAN 2021", "U-VAN 2028" and "U-VAN 28-60" (all products of Mitsui Chemicals, Inc.).

When the water-based coating composition contains a melamine resin, the water-based coating composition may contain a sulfonic acid such as paratoluenesulfonic acid, dodecylbenzenesulfonic acid or dinonylnaphthalenesulfonic acid; a neutral salt of sulfonic acid and an amine; or a neutral salt of a phosphoric acid ester compound and an amine, as a curing catalyst.

The polyisocyanate compound (C2) is a compound with at least two isocyanate groups in the molecule, and examples include aliphatic polyisocyanates, alicyclic polyisocyanates, araliphatic polyisocyanates, aromatic polyisocyanates, and derivatives of these polyisocyanates.

Examples of aliphatic polyisocyanates include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate and methyl 2,6-diisocyanatohexanoate (common name: lysine diisocyanate); and aliphatic triisocyanates such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane.

Examples of alicyclic polyisocyanates include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, methylenebis(4,1-cyclohexanediyl)diisocyanate (common name: hydrogenated MDI) and norbornane diisocyanate; and alicyclic triisocyanates such as 1,3,5-triisocyanatocyclohexane, 1,3,5-trimethylisocyanatocyclohexane, 2-(3-isocyanatopropyl)-2,5-dnisocyanatomethyl)-bicyclo(2.2.1) heptane, 2-(3-isocyanatopropyl)-2,6-di(isocyanatomethyl)-bicyclo(2.2.1)heptane, 3-(3-isocyanatopropyl)-2,5-dnisocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1)heptane.

Examples of araliphatic polyisocyanates include araliphatic diisocyanates such as methylene bis(4,1-phenylene) diisocyanate (common name: MDI), 1,3- or 1,4-xylylene diisocyanate or mixtures thereof, ω,ω'-diisocyanato-1,4-diethylbenzene and 1,3- or 1,4-bis(1-isocyanato-1-methylethyl)benzene (common name: tetramethylxylylene diisocyanate) or mixtures thereof; and araliphatic triisocyanates such as 1,3,5-triisocyanatomethylbenzene.

Examples of aromatic polyisocyanates include aromatic diisocyanates such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI), or mixtures thereof, 4,4'-toluidine diisocyanate and 4,4'-diphenyl ether diisocyanate; aromatic triisocyanates such as triphenylmethane-4,4',4"-triisocyanate, 1,3,5-triisocyanatobenzene and 2,4,6-triisocyanatotoluene; and aromatic tetraisocyanates such as 4,4'-diphenylmethane-2,2',5,5'-tetraisocyanate.

Examples of the aforementioned polyisocyanate derivatives include the aforementioned polyisocyanate dimers, trimers, biurets, allophanates, urethodiones, urethoimines, isocyanurates and oxadiazinetriones, as well as polymethylenepolyphenyl polyisocyanate (crude MDI, polymeric MDI) and crude TDI.

These polyisocyanates and their derivatives may be used alone or in combinations of two or more. Aliphatic diisocyanates, alicyclic diisocyanates and their derivatives are preferred among these polyisocyanates.

The polyisocyanate compound that is used may also be a prepolymer obtained by reacting any of the aforementioned polyisocyanates and their derivatives with a compound that can react with the polyisocyanate, under conditions with an excess of isocyanate groups. Compounds that can react with the aforementioned polyisocyanates include compounds with active hydrogen groups such as hydroxyl and amino groups, and specifically there may be used polyhydric alcohols, low molecular weight polyester resins, amines, water and the like.

The polyisocyanate compound used may also be a polymer of an isocyanate group-containing polymerizable unsaturated monomer, or a copolymer of such an isocyanate group-containing polymerizable unsaturated monomer and a polymerizable unsaturated monomer other than the isocyanate group-containing polymerizable unsaturated monomer.

The blocked polyisocyanate compound (C3) is a compound wherein the isocyanate groups of the polyisocyanate compound (C2) are blocked with a blocking agent.

Examples of such blocking agents include phenol-based compounds such as phenol, cresol, xylenol, nitrophenol, ethylphenol, hydroxydiphenyl, butylphenol, isopropylphenol, nonylphenol, octylphenol and methyl hydroxybenzoate; lactam-based compounds such as ε-caprolactam, δ-valerolactam, γ-butyrolactam and β-propiolactam; aliphatic alcohol-based compounds such as methanol, ethanol, propyl alcohol, butyl alcohol, amyl alcohol and lauryl alcohol; ether-based compounds such as ethyleneglycol monomethyl ether, ethyleneglycol monoethyl ether, ethyleneglycol monobutyl ether, diethyleneglycol monomethyl ether, diethyleneglycol monoethyl ether, propyleneglycol monomethyl ether and methoxymethanol; alcohol-based compounds such as benzyl alcohol, glycolic acid, methyl glycolate, ethyl glycolate, butyl glycolate, lactic acid, methyl lactate, ethyl lactate, butyl lactate, methylolurea, methylolmelamine, diacetone alcohol, 2-hydroxyethyl acrylate and 2-hydroxyethyl methacrylate; oxime-based compounds such as formamideoxime, acetamideoxime, acetooxime, methylethylketooxime, diacetylmonooxime, benzophenoneoxime and cyclohexaneoxime; active methylene-based compounds such as dimethyl malonate, diethyl malonate, ethyl acetoacetate, methyl acetoacetate and acetylacetone; mercaptane-based compounds such as butylmercaptane, t-butylmercaptane, hexylmercaptane, t-dodecylmercaptane, 2-mercaptobenzothiazole, thiophenol, methylthiophenol and ethylthiophenol; acid amide-based compounds such as acetoanilide, acetanisidide, acetotoluide, acrylamide, methacrylamide, acetic acid amide, stearic acid amide and benzamide; imide-based compounds such as succinic acid imide, phthalic acid imide and maleic acid imide; amine-based compounds such as diphenylamine, phenylnaphthylamine, xylidine, N-phenylxylidine, carbazole, aniline, naphthylamine, butylamine, dibutylamine and butylphenylamine; imidazole-based compounds such as imidazole and 2-ethylimidazole; urea-based compounds such as urea, thiourea, ethyleneurea, ethylenethiourea and diphenylurea; carbamic acid ester-based compounds such as phenyl N-phenylcarbamate; imine-based compounds such as ethyleneimine and propyleneimine; sulfite-based compounds such as sodium bisulfite and potassium bisulfite; and azole-based compounds. Azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole and 3-methyl-5-phenylpyrazole; imidazole or imidazole derivatives, such as imidazole, benzimidazole, 2-methylimidazole, 2-ethylimidazole and 2-phenylimidazole; and imidazoline derivatives such as 2-methylimidazoline and 2-phenylimidazoline.

Preferred blocking agents among these include active methylene-based blocking agents, and pyrazole or pyrazole derivatives.

A solvent may also be added as necessary for blocking (reaction with a blocking agent). The solvent used for the blocking reaction may be any one that is not reactive with isocyanate groups, examples of which include ketones such as acetone and methyl ethyl ketone, esters such as ethyl acetate, and N-methyl-2-pyrrolidone (NMP) solvents.

Blocking agents that may be used include hydroxycarboxylic acids having one or more hydroxyl groups and one or more carboxyl groups, such as hydroxypivalic acid or dimethylolpropionic acid. It is particularly preferred to use a blocked polyisocyanate compound which has the isocyanate group blocked using the hydroxycarboxylic acid, and subsequently has the carboxyl group of the hydroxycarboxylic acid neutralized, to provide water-dispersibility.

Each curing agent (C) used may be of a single type or a combination of two or more types.

The content of the curing agent (C) is preferably 1 to 50 mass %, more preferably 5 to 45 mass % and even more preferably 10 to 40 mass %, based on the resin solid content of the water-based coating composition.

Urethane Resin Particles (D)

The urethane resin particles (D) are urethane resin particles obtained from a constituent component that includes a polyisocyanate component (d1) comprising at least one type of diisocyanate (d1-1) selected from among xylylene diisocyanates and hydrogenated xylylene diisocyanates, and a polyol component (d2). In other words, the urethane resin particles (D) are the reaction product of a polyisocyanate component (d1) comprising at least one type of diisocyanate (d1-1) selected from among xylylene diisocyanates and hydrogenated xylylene diisocyanates, and a polyol component (d2).

The urethane resin particles (D) can be synthesized using the polyisocyanate component (d1) comprising at least one type of diisocyanate (d1-1) selected from among xylylene diisocyanates and hydrogenated xylylene diisocyanates, the polyol component (d2), and if necessary a compound having both an active hydrogen group and an ion-forming group, as a component to provide a water dispersion group.

Polyisocyanate Component (d1)

According to the invention, the polyisocyanate component (d1) comprises at least one type of diisocyanate (d1-1) selected from among xylylene diisocyanates and hydrogenated xylylene diisocyanates.

At Least One Type of Diisocyanate (d1-1) Selected from Among Xylylene Diisocyanates and Hydrogenated Xylylene Diisocyanates The diisocyanate (d1-1) is at least one type of diisocyanate selected from among xylylene diisocyanates and hydrogenated xylylene diisocyanates.

Examples of xylylene diisocyanate to be used include 1,3-xylylene diisocyanate and 1,4-xylylene diisocyanate, among which 1,3-xylylene diisocyanate is preferred.

Examples of preferred hydrogenated xylylene diisocyanates for use include 1,3-hydrogenated xylylene diisocyanate and 1,4-hydrogenated xylylene diisocyanate.

The diisocyanate (d1-1) may use a xylylene diisocyanate and a hydrogenated xylylene diisocyanate either each alone or in combinations of two or more.

The diisocyanate (d1-1) used may also be a commercial product.

An example of a commercially available xylylene diisocyanate product is "TAKENATE 500" (1,3-xylylene diisocyanate, trade name of Mitsui Chemicals, Inc.).

Examples of commercially available hydrogenated xylylene diisocyanate products include "TAKENATE 600" (1,3-hydrogenated xylylene diisocyanate), trade name of Mitsui Chemicals, Inc.) and "FORTIMO" (1,4-hydrogenated xylylene diisocyanate, trade name of Mitsui Chemicals, Inc.).

From the viewpoint of the finished appearance of the formed multilayer coating film and the storage properties of the water-based coating composition of the invention, the diisocyanate (d1-1) used is most preferably a xylylene diisocyanate.

According to the invention, the content ratio of the diisocyanate (d1-1) in the polyisocyanate component (d1) of the urethane resin particles (D) is preferably in the range of 20 to 100 mass %, more preferably in the range of 30 to 100 mass % and even more preferably in the range of 50 to 100 mass %, based on the total solid content of the polyisocyanate component (d1), from the viewpoint of the finished appearance of the formed multilayer coating film and the storage properties of the water-based coating composition of the invention.

Polyisocyanate (d1-2) Other than Diisocyanate (d1-1)

Examples for the polyisocyanate (d1-2) other than at least one type of diisocyanate (d1-1) selected from among xylylene diisocyanates and hydrogenated xylylene diisocyanates, include isophorone diisocyanate (IPDI), 2,4-tolylene diisocyanate (2,4-TDI) and mixtures thereof with 2,6-tolylene diisocyanate (2,6-TDI), 4,4'-diphenylmethane diisocyanate, 1,4-phenylene diisocyanate, 1,5-naphthalene diisocyanate, hexamethylene diisocyanate (HMDI), trimethylhexamethylene diisocyanate, cyclohexane-1,4-diisocyanate, 4,4'-dicyclohexylmethane diisocyanate (hydrogenated MDI) and tetramethylxylylene diisocyanate.

If necessary, a trimer of TDI, HMDI, IPDI and the like, or a trivalent polyisocyanate as a reaction product with trimethylolpropane, may also be used. These polyisocyanate compounds may be used alone or in combinations of two or more.

Polyol Component (d2)

The polyol component (d2) is a compound having at least two hydroxyl groups in the molecule. From the viewpoint of productivity of the urethane resin particles (D), the polyol component (d2) is preferably a diol having two hydroxyl groups in the molecule.

Examples for the polyol component (d2) include low-molecular-weight polyols such as ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexaneglycol, 2,5-hexanediol, dipropylene glycol, 2,2,4- trimethyl-1,3-pentanediol, tricyclodecanedimethanol and 1,4-cyclohexanedimethanol. These low-molecular-weight polyols may be used alone or in combinations of two or more.

Examples for the polyol component (d2) also include high-molecular-weight polyols such as polyether polyol (d2-1), polycarbonate polyol (d2-2), polyester polyol (d2-3) and polyether ester polyol (d2-4) compounds. These high-molecular-weight polyols may also be used alone or in combinations of two or more.

The polyether polyol (d2-1) used may be an alkylene oxide addition product of a low-molecular-weight polyol, an alkylene oxide or a ring-opening (co)polymer of a cyclic ether (such as tetrahydrofuran). Specific examples include polyethylene glycol, polypropylene glycol, ethylene glycol-propylene glycol (block or random) copolymer, polytetramethylene glycol, polyhexamethylene glycol and polyoctamethylene glycol.

The polyether polyol (d2-1) used is preferably polyethylene glycol, polypropylene glycol or polytetramethylene glycol. From the viewpoint of productivity and flexibility of the formed coating film, the number-average molecular weight of the polyether polyol (d2-1) is preferably 500 to 10,000, more preferably 1000 to 5000 and even more preferably 1600 to 4000.

The polyether polyol (d2-1) used may be a single type alone, or a combination of two or more types.

Examples for the polycarbonate polyol (d2-2) include compounds represented by the following formula:

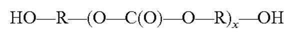

$$HO—R—(O—C(O)—O—R)_x—OH$$

(where R represents a C1-12 alkylene or C1-3 alkylene-C3-8 cycloalkylene-C1-3 alkylene group, x represents the number of repeating units in the molecule, which is usually an integer of 5 to 50, and multiple R groups may be the same or different). These compounds can be obtained by ester-exchange in which a polyol and a substituted carbonate (such as diethyl carbonate or diphenyl carbonate) are reacted under conditions with an excess of hydroxyl groups, or a method of reacting the saturated aliphatic polyol with phosgene, and if necessary further subsequently reacting it with a saturated aliphatic polyol.

C1-12 alkylene groups (saturated aliphatic polyol residues) represented by R include straight-chain or branched (preferably straight-chain) alkylene groups of 1 to 12 carbon atoms, examples of which include $—CH_2—$, $—(CH_2)_2—$, $—(CH_2)_3—$, $—(CH_2)_4—$, $—CH_2—CH(CH_3)—CH_2—$, $—(CH_2)_5—$, $—CH_2—CH(C_2H_5)—CH_2—$, $—(CH_2)_6—$, $—(CH_2)_7—$, $—(CH_2)_8—$, $—(CH_2)_9—$, $—(CH_2)_{10}—$, $—(CH_2)_{11}—$ and $—(CH_2)_{12}$.

The C1-3 alkylene group in the "C1-3 alkylene-C3-8 cycloalkylene-C1-3 alkylene group" represented by R represents a straight-chain or branched (preferably straight-chain) alkylene group of 1 to 3 carbon atoms (preferably 1), and methylene, ethylene and propylene groups (n-propylene and isopropylene groups) may be mentioned.

The two "C1-3 alkylene" groups in the "C1-3 alkylene-C3-8 cycloalkylene-C1-3 alkylene group" may be the same or different (and are preferably the same).

The C3-8 cycloalkylene group in the "C1-3 alkylene-C3-8 cycloalkylene-C1-3 alkylene group" represents a divalent hydrocarbon group that can be derived by removing two hydrogen atoms from a cycloalkane of 3 to 8 carbon atoms (preferably 5 to 7 carbon atoms and more preferably 6 carbon atoms), and examples include 1,1-cyclopropylene, 1,2-cyclopropylene, 1,1-cyclobutylene, 1,2-cyclobutylene, 1,3-cyclobutylene, 1,2-cyclopentylene, 1,3-cyclopentylene, 1,1-cyclohexylene, 1,2-cyclohexylene, 1,3-cyclohexylene, 1,4-cyclohexylene, 1,3-cycloheptylene and 1,4-cyclooctylene.

The C1-3 alkylene-C3-8 cycloalkylene-C1-3 alkylene group may be a divalent substituent comprising the aforementioned C1-3 alkylene, C3-8 cycloalkylene and C1-3 alkylene groups bonded in that order, and more specific examples include methylene-1,2-cyclopropylene-methylene, methylene-1,2-cyclopropylene-ethylene, ethylene-1,2-cyclopropylene-ethylene, methylene-1,3-cyclobutylene-methylene, methylene-1,3-cyclopentylene-methylene, methylene-1,1-cyclohexylene-methylene, methylene-1,3-cyclohexylene-methylene, methylene-1,4-cyclohexylene-methylene, ethylene-1,4-cyclohexylene-ethylene, methylene-1,4-cyclohexylene-ethylene, propylene-1,4-cyclohexylene-propylene, methylene-1,3-cycloheptylene-methylene and methylene-1,4-cyclooctylene-methylene.

From the viewpoint of productivity and the physical properties of the obtained coating film, the R of the polycarbonate polyol (d2-2) is preferably a saturated aliphatic polyol residue of 1 to 12 carbon atoms and more preferably a saturated aliphatic polyol residue of 4 to 10 carbon atoms. From the viewpoint of productivity, the number-average molecular weight of the polycarbonate polyol (d2-2) is preferably 500 to 10,000, more preferably 1000 to 5000 and even more preferably 1600 to 4000. These polycarbonate polyol (d2-2) compounds may be used alone or in combinations of two or more.

The polyester polyol (d2-3) can be one obtained by polycondensation of a dicarboxylic acid (anhydride) such as adipic acid, succinic acid, sebacic acid, glutaric acid, maleic acid, fumaric acid or phthalic acid, with a low-molecular-weight polyol such as ethylene glycol, propylene glycol, 1,4-butanediol, 1,6-hexanediol, 1,8-octamethylenediol or neopentyl glycol, under conditions with an excess of hydroxyl groups. Specific examples include ethylene glycol-adipic acid condensate, butanediol-adipic acid condensate, hexamethylene glycol-adipic acid condensate, ethylene glycol-propylene glycol-adipic acid condensate and polylactone polyol obtained by ring-opening polymerization of a lactone with glycol as the initiator. These polyester polyol (d2-3) compounds may be used alone or in combinations of two or more.

The polyether ester polyol (d2-4) may be one obtained by adding an ether group-containing polyol (such as a polyether polyol (d2-1) or diethylene glycol) or a mixture thereof with another glycol, to a dicarboxylic acid (anhydride) mentioned for the polyester polyol (d2-3), and reacting them with the alkylene oxide, an example of which is polytetramethylene glycol-adipic acid condensate. These polyether ester polyol (d2-4) compounds may be used alone or in combinations of two or more.

The polyol component (d2) preferably comprises the polyether polyol (d2-1) and polycarbonate polyol (d2-2) from the viewpoint of storage stability of the water-based coating composition of the invention and chipping resistance of the formed multilayer coating film.

When the polyol component (d2) comprises the polyether polyol (d2-1) and polycarbonate polyol (d2-2), the total content of the polyether polyol (d2-1) and polycarbonate polyol (d2-2) is preferably in the range of 30 to 100 mass %, more preferably in the range of 50 to 100 mass % and even more preferably in the range of 70 to 100 mass % based on the total solid content of the polyol component (d2), from the viewpoint of storage stability of the water-based coating composition of the invention and finished appearance of the formed multilayer coating film.

Furthermore, when the polyol component (d2) comprises the polyether polyol (d2-1) and polycarbonate polyol (d2-2), the content ratio of the polyether polyol (d2-1) and polycarbonate polyol (d2-2) is preferably 99/1 to 30/70, more preferably 95/5 to 50/50 and even more preferably 90/10 to 60/40, as the mass ratio of polyether polyol (d2-1)/polycarbonate polyol (d2-2), from the viewpoint of storage stability of the water-based coating composition of the invention and chipping resistance of the formed multilayer coating film.

Compounds having both an active hydrogen group and an ion-forming group include compounds with two or more hydroxyl groups and one or more carboxyl groups in the molecule, compounds with two or more hydroxyl groups and one or more sulfonic acid groups in the molecule, and compounds having two or more amino groups and one or more carboxyl groups in the molecule, any of which may be used alone or in combinations of two or more.

Preferred as compounds having both an active hydrogen group and an ion-forming group are compounds with two or more hydroxyl groups and one or more carboxyl groups in the molecule and compounds with two or more hydroxyl groups and one or more sulfonic acid groups in the molecule. According to the invention, compounds having both two or more hydroxyl groups and an ion-forming group, such as compounds with two or more hydroxyl groups and one or more carboxyl groups in the molecule and compounds with two or more hydroxyl groups and one or more sulfonic acid groups in the molecule, are encompassed by the polyol component (d2).

Examples of compounds with two or more hydroxyl groups and one or more carboxyl groups in the molecule include alkanolcarboxylic acid compounds such as dimethylolpropionic acid, dimethylolacetic acid, dimethylolbutanoic acid, dimethylolheptanoic acid, dimethylolnonanoic acid, 1-carboxy-1,5-pentylenediamine, dihydroxybenzoic acid and 3,5-diaminobenzoic acid, and half ester compounds comprising polyoxypropylenetriol and maleic anhydride and/or phthalic anhydride.

Examples of compounds with two or more hydroxyl groups and one or more sulfonic acid groups in the molecule include 2-sulfonic acid-1,4-butanediol, 5-sulfonic hydroxyethylisophthalate and N,N-bis(2-hydroxyethyl)aminoethylsulfonic acid.

From the viewpoint of flexibility of the obtained coating film, the compounds having both an active hydrogen group and an ion-forming group are most preferably compounds with two or more hydroxyl groups and one or more carboxyl groups in the molecule.

A compound having both an active hydrogen group and an ion-forming group acts as an ion-forming group in the urethane resin particles (D). Such a compound is preferably used from the viewpoint of the dispersion stability of the urethane resin particles (D).

When a compound having both an active hydrogen group and an ion-forming group is used, it is used in an amount preferably in the range of 1 to 10 mass %, more preferably in the range of 1 to 7 mass % and even more preferably in the range of 1 to 5 mass % with respect to the total amount of the compounds composing the urethane resin particles (D), from the viewpoint of aqueous dispersion stability and the water resistance of the coated film.

The urethane resin particles (D) of the invention will usually be synthesized as a dispersion in an aqueous solvent, and the form of the urethane resin particles (D) is not particularly restricted so long as they are dispersed in an aqueous solvent. An "aqueous solvent" is a solvent composed mainly of water (such as a solvent comprising 90 to 100 mass % water).

The method of producing the urethane resin particles (D) is not particularly restricted, and any conventionally known method may be employed. An example for the production method is a method in which urethanation reaction is carried out between the polyisocyanate component (d1) and the polyol component (d2), or if necessary a compound having both an active hydrogen group and an ion-forming group is further added and urethanation reaction is carried out, in an organic solvent to synthesize a prepolymer, and the obtained prepolymer is emulsified, if necessary with subsequent chain extension reaction and solvent removal.

A catalyst may also be used if necessary for the urethanation reaction between the polyisocyanate component (d1) and polyol component (d2).

Examples of catalysts include bismuth carboxylate compounds such as bismuth(III) tris(2-ethylhexanoate); organic tin compounds such as dibutyltin dilaurate, dibutyltin dioctoate and stannous octoate; and tertiary amine compounds such as triethylamine and triethylenediamine.

From the viewpoint of environmental adaptability, bismuth-based catalysts are preferred for their relatively low toxicity.

The urethanation reaction is preferably carried out at 50 to 120° C.

A prepolymer of the urethane resin particles (D) is obtained in this manner.

For synthesis of the prepolymer, the organic solvent used may be an organic solvent that is inactive to isocyanates and does not interfere with the urethanation reaction. Examples of such organic solvents include aromatic hydrocarbon-based solvents such as toluene and xylene, ester-based solvents such as ethyl acetate and butyl acetate, and ketone-based solvents such as acetone and methyl ethyl ketone. Preferred for use among these are ketone-based solvents and ester-based solvents, from the viewpoint of aqueous dispersion stability.

A neutralizer for the ion-forming groups and deionized water may also be added to the urethane prepolymer if necessary, for aqueous dispersion (emulsification), and chain extension reaction and solvent removal may also be carried out as necessary, to obtain an aqueous dispersion of the urethane resin particles (D).

Neutralizers are not particularly restricted so long as they can neutralize the ion-forming groups, and examples of basic compounds for neutralization include organic amines such as ammonia, diethylamine, ethylethanolamine, diethanolamine, triethanolamine, monoethanolamine, monopropanolamine, isopropanolamine, ethylaminoethylamine, hydroxyethylamine, triethylamine, tributylamine, dimethylethanolamine and diethylenetriamine; or alkali metal hydroxides such as sodium hydroxide and potassium hydroxide. Any of these neutralizers may be used alone or in combinations of two or more.

Organic amines are preferred among these basic compounds from the viewpoint of the water resistance of the coated film obtained by application to the coating composition.

These neutralizing agents are preferably used in amounts such that the final pH of the aqueous dispersion of the urethane resin particles (D) is about 6.0 to 9.0.

When a neutralizer is added, the amount of neutralizer added is preferably 0.1 to 1.5 equivalents and more preferably 0.3 to 1.2 equivalents with respect to the acid groups such as carboxyl groups.

The means for obtaining the aqueous dispersion may be dispersion with a common stirrer, but a homomixer, homogenizer, disper or line mixer may also be used in order to obtain a homogeneous aqueous dispersion with a narrower particle size.

For chain extension reaction (high molecularization) of the urethane prepolymer, a chain extender other than water may be added as necessary for reaction between the urethane prepolymer and the chain extender. The chain extender used may be a publicly known chain extender such as active hydrogen. Specific examples include diamine compounds such as ethylenediamine, hexamethylenediamine, cyclohexanediamine, cyclohexylmethanediamine and isophoronediamine, triamine compounds such as diethylenetriamine, and hydrazine.

From the viewpoint of increasing the degree of chain extension, it is preferred to use a trifunctional or greater amine compound, which may be a triamine compound such as diethylenetriamine From the viewpoint of the flexibility of the obtained coating film it is preferred to use a diamine compound such as ethylenediamine.

For introduction of a reactive functional group it is also preferred to use a compound having one or more each of amines and hydroxyl groups in the molecule, such as hydroxyethylaminoethylamine.

From the viewpoint of productivity, the content ratio of the polyisocyanate component (d1) and polyol component (d2) of the urethane resin particles (D) is preferably 1/1.01 to 1/3.0 and more preferably 1/1.05 to 1/2.0, as the molar ratio of:

active hydrogen groups of polyol component (d2)/isocyanate groups of polyisocyanate component (d1).

From the viewpoint of dispersibility, productivity and obtained coating film performance, the number-average molecular weight of the urethane resin particles (D) is preferably 2000 or higher, more preferably 5000 or higher and even more preferably 10,000 or higher.

A number-average molecular weight of 2000 or higher will result in satisfactory coating film performance.

From the viewpoint of dispersibility and storage stability, the urethane resin particles (D) may have a mean particle size of generally in the range of 10 to 5000 nm, preferably 10 to 1000 nm, even more preferably 20 to 500 nm and most preferably 50 to 300 nm.

As used herein, the mean particle diameter of the urethane resin particles (D) is the value measured using a submicron particle size distribution analyzer at 20° C., after dilution with deionized water by a common method. As an example of a submicron particle size distribution analyzer, there may be used a "COULTER N4" (trade name of Beckman Coulter, Inc.).

Also, from the viewpoint of the aqueous dispersion stability and water resistance of the obtained coating film, the urethane resin particles (D) have an acid value of preferably 5 to 40 mgKOH/g, more preferably 5 to 30 mgKOH/g and even more preferably 10 to 30 mgKOH/g.

From the viewpoint of the water resistance of the obtained coating film, the urethane resin particles (D) have a hydroxyl value of preferably 0 to 100 mgKOH/g, more preferably 0 to 50 mgKOH/g and even more preferably 0 to 10 mgKOH/g.

The solid concentration of the urethane resin particles (D) in aqueous dispersion is preferably 20 to 50 mass % and more preferably in the range of 30 to 50 mass %. If the solid concentration is 50 mass % or lower then emulsification will be facilitated and it will be possible to more easily obtain an aqueous dispersion. If the solid concentration is 20 mass % or higher, the solvent component will be reduced and the solid content of the water-based coating composition can thus be increased.

The content of the urethane resin particles (D) is preferably 1 to 50 mass %, more preferably 5 to 45 mass % and even more preferably 10 to 40 mass %, based on the resin solid content of the water-based coating composition.

From the viewpoint of the finished appearance of the formed multilayer coating film and the storage stability of the coating composition of the invention, the urethane resin particles (D) are preferably urethane resin particles (D') having a core-shell structure.

Urethane Resin Particles (D') Having a Core-Shell Structure

The urethane resin particles (D') having a core-shell structure are urethane resin particles having a core-shell structure, obtained from a constituent component that includes a polyisocyanate component (d1) comprising at least one type of diisocyanate (d1-1) selected from among xylylene diisocyanates and hydrogenated xylylene diisocyanates and a polyol component (d2).

The urethane resin particles (D') having a core-shell structure will usually be synthesized as a dispersion in an aqueous solvent, and while there are no particular restrictions on the form of the urethane resin particles so long as they are dispersed in the aqueous solvent, they are preferably dispersed in water as particles having a structure with the urethane resin (II) composing the shell sections situated around the urethane resin (I) composing the core sections in a dispersion-stable manner. In other words, they are preferably dispersed in the aqueous solvent in a form having a core-shell structure with the urethane resin (II) on the outsides and the urethane resin (I) on the insides. It is believed that this is essentially the form of the particles in actuality.

An "aqueous solvent" is a solvent composed mainly of water (such as a solvent comprising 90 to 100 mass % water).

Specifically, a core-shell structure is a structure in which different resin composition components are present in the same particles, forming center sections (cores) and outer shell portions (shells) with different resin compositions.

The core-shell structure will usually be a layered structure with the core section totally covered by the shell section, but depending on the mass ratio of the core section and shell section and other conditions, the shell section may be insufficient to form a layered structure. In such cases, it is not necessary for it to be a completely layered structure as described above, but instead it may be a structure with only portions of the core section covered by the shell section.

The urethane resin particles (D') having a core-shell structure are urethane resin particles in a form dispersed in an aqueous solvent, while having a core-shell structure with the urethane resin (II) on the outsides and the urethane resin (I) on the insides.

The component proportion ratio of the urethane resin (I) composing the core sections and the urethane resin (II) composing the shell sections of the urethane resin particles (D') having a core-shell structure is preferably 20/80 to 95/5, more preferably 40/60 to 90/10 and even more preferably 60/40 to 80/20, as the mass ratio of urethane resin (I)/urethane resin (II).

The method of producing the urethane resin particles (D') having a core-shell structure may be any conventional known method for producing urethane resin particles so long as they adopt a form with a core-shell structure, but from the viewpoint of production stability (dispersion stability of the obtained resin particles), it is preferably production by the following method (comprising the following steps 1 to 3).

1. First, a hydroxyl-terminated urethane resin (II) containing a hydrophilic group is synthesized.

2. Next, the starting material for the urethane resin (I) is added, grafting the urethane resin (I) onto the urethane resin (II), to synthesize an isocyanate-terminal prepolymer.

3. The obtained prepolymer is emulsified and if necessary subjected to chain extension reaction and solvent removal, to obtain urethane resin particles (D') having a core-shell structure.

The urethane resin particles (D') having a core-shell structure can be obtained by a method including a step of reacting a monomer mixture containing the polyisocyanate component (II-di) and the polyol component (II-d2) to obtain the urethane resin (II), and a step of reacting a monomer mixture containing the polyisocyanate component (I-d1) and polyol component (I-d2), in the presence of the urethane resin (II), to synthesize the urethane resin (I), wherein either or both the polyisocyanate component (II-di) and the polyisocyanate component (I-d1) include at least one type of diisocyanate (d1-1) selected from among xylylene diisocyanates and hydrogenated xylylene diisocyanates.

A method for producing the urethane resin particles (D') having a core-shell structure will now be described in greater detail, although the urethane resin particles (D') having a core-shell structure are in no way limited to being obtained by this method.

Synthesis of Urethane Resin (II)

The urethane resin (II) is a component composing the shell sections of the urethane resin particles (D') having a core-shell structure, and it can be synthesized using the polyisocyanate component (II-di), the polyol component (II-d2), and if necessary a compound having both an active hydrogen group and an ion-forming group, as a component that provides a water dispersing group.

The polyisocyanate component (II-d1) used may be at least one type of diisocyanate (d1-1) selected from among xylylene diisocyanates and hydrogenated xylylene diisocyanates and a polyisocyanate (d1-2) other than the diisocyanate (d1-1), any of which may be used alone or in combinations of two or more.

From the viewpoint of yellowing resistance of the coating film obtained by application of the coating composition, the polyisocyanate component (II-di) that is used is preferably a polyisocyanate compound with a saturated aliphatic structure and/or a polyisocyanate compound with a saturated alicyclic structure. The polyisocyanate compound with a saturated aliphatic structure may be hexamethylene diisocyanate (HMDI), specifically, and the polyisocyanate compound with a saturated alicyclic structure may be isophorone diisocyanate (IPDI) or 4,4'-dicyclohexylmethane diisocyanate (hydrogenated MDI), specifically.

The polyol component (II-d2) is a compound having at least two hydroxyl groups in the molecule, and for example, any of the low-molecular-weight polyols, the polyether polyol (d2-1), polycarbonate polyol (d2-2), polyester polyol (d2-3) and polyether ester polyol (d2-4) mentioned for the polyol (d2) of the urethane resin (D) may be used. Any of these may be used alone or in combinations of two or more.

From the viewpoint of storage stability of the water-based coating composition of the invention, the polyol component (II-d2) preferably comprises the polycarbonate polyol (d2-2) for at least one type.

When the polyol component (II-d2) comprises the polycarbonate polyol (d2-2), for storage stability of the water-based coating composition of the invention the content ratio of the polycarbonate polyol (d2-2) in the urethane resin (II) is preferably in the range of 5 to 100 mass %, more preferably in the range of 5 to 80 mass % and even more preferably in the range of 10 to 60 mass %, based on the total solid content of the polyol component (II-d2) in the urethane resin (II).

From the viewpoint of productivity, the number-average molecular weight of the polycarbonate polyol (d2-2) is preferably 500 to 10,000, more preferably 1000 to 5000 and even more preferably 1600 to 4000.

Examples of compounds having both an active hydrogen group and an ion-forming group that may be used include compounds having both an active hydrogen group and an ion-forming group that were mentioned above in the description of the urethane resin (D). Compounds having two or more hydroxyl and ion-forming groups are included among compounds for the polyol component (II-d2) mentioned above.

Compounds having both an active hydrogen group and an ion-forming group may be used alone, or two or more may be used in combination. Such compounds act as ion-forming groups in urethane resins. The compounds are also preferably used from the viewpoint of the dispersion stability of the urethane resin particles (D').

From the viewpoint of flexibility of the obtained coating film, the compounds having an active hydrogen group and an ion-forming group that are used are preferably compounds with two or more hydroxyl groups and one or more carboxyl groups in the molecule.

When a compound having both an active hydrogen group and an ion-forming group is used, it is used in an amount preferably in the range of 2 to 40 mass %, more preferably in the range of 3 to 30 mass % and even more preferably in the range of 5 to 20 mass % with respect to the total amount of the compounds composing the urethane resin (II), from the viewpoint of aqueous dispersion stability and the water resistance of the coated film.

When a compound comprising a carboxyl group or a sulfonic acid group is used as a compound having both an active hydrogen group and an ion-forming group, the neutralizer used to form a salt for hydrophilization may be an amine compound such as trimethylamine, triethylamine, monoethanolamine, diethanolamine, triethanolamine, triethylenediamine or dimethylaminoethanol, or an alkali metal compound such as sodium hydroxide or potassium hydroxide. Any of these neutralizers may be used alone or in combinations of two or more.

The neutralization rate for the carboxyl groups or sulfonic acid groups may usually be 50 to 100 mol %. Dimethylaminoethanol is a preferred neutralizer from the viewpoint of dispersibility.

In the graft step for the urethane resin (I), described below, the urethane resin (II) is preferably synthesized under conditions with an excess of hydroxyl groups so that hydroxyl groups remain, from the viewpoint of increasing the graft efficiency.

From the viewpoint of productivity, the content ratio of the polyisocyanate component (II-d1) and the polyol component (II-d2) of the urethane resin (II) is preferably 1.01/1 to 3.0/1 and more preferably 1.05/1 to 2.0/1, as the molar ratio of:

active hydrogen groups of polyol component (II-d2)/isocyanate groups of polyisocyanate component (II-di).

A catalyst may also be used if necessary for the urethanation reaction between the polyol component (II-d2) and the polyisocyanate component (II-d1).

Examples of catalysts include bismuth carboxylate compounds such as bismuth(III) tris(2-ethylhexanoate); organic tin compounds such as dibutyltin dilaurate, dibutyltin dioctoate and stannous octoate; and tertiary amine compounds such as triethylamine and triethylenediamine.

From the viewpoint of environmental adaptability, bismuth-based catalysts are preferred for their relatively low toxicity.

The urethanation reaction is preferably carried out at 50 to 120° C.

For synthesis of the urethane resin (II), the organic solvent used may be an organic solvent that is inactive to isocyanates and does not interfere with the urethanation reaction. Examples of such organic solvents include aromatic hydrocarbon-based solvents such as toluene and xylene, ester-based solvents such as ethyl acetate and butyl acetate, and ketone-based solvents such as acetone and methyl ethyl ketone. Preferred for use among these are ketone-based solvents and ester-based solvents, from the viewpoint of aqueous dispersion stability.

The urethane resin (II) is obtained in the manner described above.

Synthesis of Prepolymer (Urethane Resin (I) Grafting)

The urethane resin particles (D') having a core-shell structure are preferably urethane resin particles having a core-shell structure obtained by synthesizing a urethane resin (I) in the presence of a urethane resin (II) (that is, synthesizing the urethane resin (I) unit after the urethane resin (II) unit), to graft the urethane resin (I) onto the urethane resin (II), for two-stage prepolymer synthesis, and dispersing the product in an aqueous medium (with further chain extension reaction if necessary).

The urethane resin (I) is a component composing the core sections of the urethane resin particles (D') having a core-shell structure.

The urethane resin (I) can be synthesized using the polyisocyanate component (I-d1) and polyol component (I-d2), for example.

The polyisocyanate component (I-d1) used may be at least one type of diisocyanate (d1-1) selected from among xylylene diisocyanates and hydrogenated xylylene diisocyanates and a polyisocyanate (d1-2) other than the diisocyanate (d1-1), any of which may be used alone or in combinations of two or more.

From the viewpoint of storage stability of the water-based coating composition of the invention and the finished appearance of the formed multilayer coating film, the polyisocyanate component (I-d1) used for synthesis of the urethane resin (I) preferably includes the diisocyanate (d1-1), and more preferably includes a xylylene diisocyanate.

When the polyisocyanate component (I-d1) contains the diisocyanate (d1-1), the content ratio of the diisocyanate (d1-1) is preferably in the range of 30 to 100 mass %, more preferably in the range of 30 to 85 mass % and even more preferably in the range of 30 to 70 mass %, based on the total solid content of the polyisocyanate component (I-d1) in the urethane resin (I), from the viewpoint of storage stability of the water-based coating composition of the invention and the finished appearance of the formed multilayer coating film, as well as the production stability of the urethane resin particles (D') having a core-shell structure.

When the diisocyanate (d1-1) and a polyisocyanate (d1-2) other than the diisocyanate (d1-1) are used together as the polyisocyanate component (I-d1), the polyisocyanate (d1-2) other than the diisocyanate (d1-1) preferably comprises hexamethylene diisocyanate (HMDI) as at least one of its types, from the viewpoint of the finished appearance of the formed multilayer coating film and the production stability of the urethane resin particles (D') having a core-shell structure.

When hexamethylene diisocyanate (HMDI) is used as the polyisocyanate (d1-2) other than the diisocyanate (d1-1) in the polyisocyanate component (I-d1), the content ratio of the hexamethylene diisocyanate (HMDI) is preferably in the range of 10 to 70 mass %, more preferably in the range of 15 to 70 mass % and even more preferably in the range of 30 to 70 mass %, based on the total solid content of the polyisocyanate component (I-d1) in the urethane resin (I). The content ratio of the diisocyanate (d1-1) and hexamethylene diisocyanate (HMDI) is preferably in the range of 30/70 to 90/10, more preferably in the range of 30/70 to 85/15 and even more preferably in the range of 30/70 to 70/30, as the mass ratio of diisocyanate (d1-1)/hexamethylene diisocyanate (HMDI).

The polyol component (I-d2) is a compound having at least two hydroxyl groups in the molecule, and for example, any of the low-molecular-weight polyols, the polyether polyol (d2-1), polycarbonate polyol (d2-2), polyester polyol (d2-3) and polyether ester polyol (d2-4) mentioned for the urethane resin (D) may be used. Any of these may be used alone or in combinations of two or more.

From the viewpoint of the flexibility of the coated film, the polyol component (I-d2) preferably comprises the polyether polyol (d2-1).

When the polyol component (I-d2) comprises the polyether polyol (d2-1), the content ratio of the polyether polyol (d2-1) is preferably in the range of 10 to 100 mass %, more preferably in the range of 30 to 100 mass % and even more preferably in the range of 50 to 100 mass %, based on the total solid content of the polyol component (I-d2) in the urethane resin (I), from the viewpoint of flexibility of the coated film.

From the viewpoint of productivity, the number-average molecular weight of the polyether polyol (d2-1) is preferably 500 to 10,000, more preferably 1000 to 5000 and even more preferably 1600 to 4000.

From the viewpoint of having isocyanate ends at the ends of the urethane resin (I) as the finally obtained prepolymer, synthesis is preferably under conditions with an excess of isocyanate groups so that isocyanate groups remain.

From the viewpoint of productivity, the content ratio of the polyisocyanate component (I-d1) and the polyol component (I-d2) of the urethane resin (I) is preferably 1/1.01 to 1/3.0 and more preferably 1/1.05 to 1/2.5, as the molar ratio of:

active hydrogen groups of polyol component (I-d2)/isocyanate groups of polyisocyanate component (I-d1).

A catalyst may also be used if necessary for the urethanation reaction between the polyisocyanate component (I-d1) and the polyol component (I-d2).

Examples of catalysts include bismuth carboxylate compounds such as bismuth(III) tris(2-ethylhexanoate); organic tin compounds such as dibutyltin dilaurate, dibutyltin dioctoate and stannous octoate; and tertiary amine compounds such as triethylamine and triethylenediamine.

From the viewpoint of environmental adaptability, bismuth-based catalysts are preferred for their relatively low toxicity.

The urethanation reaction is preferably carried out at 50 to 120° C.

The organic solvent used for synthesis of the prepolymer (urethane resin (I) grafting) may be an organic solvent that is inert to isocyanates and does not interfere with the urethanation reaction, and examples of such organic solvents include aromatic hydrocarbon-based solvents such as toluene and xylene, ester-based solvents such as ethyl acetate and butyl acetate and ketone-based solvents such as acetone and methyl ethyl ketone. Preferred for use among these are ketone-based solvents and ester-based solvents, from the viewpoint of aqueous dispersion stability.

The isocyanate groups of the prepolymer may also be partially or fully blocked with a blocking agent as necessary, to use blocked isocyanate groups.

A prepolymer having a structure in which the urethane resin (I) and urethane resin (II) are grafted can be obtained as described above.

From the viewpoint of the aqueous dispersion stability and water resistance of the obtained coating film, the prepolymer has an acid value of preferably 5 to 40 mgKOH/g, more preferably 5 to 30 mgKOH/g and even more preferably 10 to 30 mgKOH/g.

From the viewpoint production stability and the finished appearance of the multilayer coating film that is formed, the prepolymer has a hydroxyl value of preferably 0 to 100 mgKOH/g, more preferably 0 to 50 mgKOH/g, even more preferably 0 to 30 mgKOH/g and most preferably 0 to 10 mgKOH/g.

From the viewpoint of productivity, the number-average molecular weight of the prepolymer is preferably 2000 to 50,000, more preferably 2000 to 30,000 and even more preferably 5000 to 20,000.

Synthesis of Urethane Resin Particles (D') Having a Core-Shell Structure

A neutralizer for the ion-forming groups and deionized water may also be added to the prepolymer if necessary, for aqueous dispersion (emulsification), and chain extension reaction and solvent removal may also be carried out as necessary, to obtain an aqueous dispersion of the urethane resin particles (D') having a core-shell structure.

The neutralizer is not particularly restricted so long as it can neutralize the ion-forming groups, and examples of basic compounds for neutralization include the neutralizers mentioned above as neutralizers for the urethane resin particles (D). Any of these neutralizers may be used alone or in combinations of two or more.

Organic amines are preferred among these basic compounds from the viewpoint of the water resistance of the coated film obtained by application to the coating composition.

These neutralizers are preferably used in amounts so that the final pH of the aqueous dispersion of the urethane resin particles (D') having a core-shell structure is about 6.0 to 9.0.

When a neutralizer is added, the amount of neutralizer added is preferably in the range of 0.1 to 1.5 equivalents and more preferably in the range of 0.3 to 1.2 equivalents with respect to the acid groups such as carboxyl groups.

The means for obtaining the aqueous dispersion may be dispersion with a common stirrer, but a homomixer, homogenizer, disper or line mixer may also be used in order to obtain a homogeneous aqueous dispersion with a narrower particle size.

For chain extension reaction (high molecularization) of the prepolymer, a chain extender other than water may be added as necessary for reaction between the urethane prepolymer and the chain extender. The chain extender used may be a publicly known chain extender having active hydrogen. Specific examples include diamine compounds such as ethylenediamine, hexamethylenediamine, cyclohexanediamine, cyclohexylmethanediamine and isophoronediamine, triamine compounds such as diethylenetriamine, and hydrazine.

From the viewpoint of increasing the degree of chain extension, it is preferred to use a trifunctional or greater amine compound, which may be a triamine compound such as diethylenetriamine From the viewpoint of the flexibility of the obtained coating film it is preferred to use a diamine compound such as ethylenediamine.

For introduction of a reactive functional group it is also preferred to use a compound having one or more each of amines and hydroxyl groups in the molecule, such as hydroxyethylaminoethylamine.

From the viewpoint of productivity, the content ratio of the polyisocyanate component (d1) and polyol component (d2) of the urethane resin particles (D') having a core-shell structure is preferably 1/1.01 to 1/3.0 and more preferably 1/1.05 to 1/2.0, as the molar ratio of:

active hydrogen groups of polyol component (d2)/isocyanate groups of polyisocyanate component (d1).

The compound used for at least one type of diisocyanate (d1-1) selected from among xylylene diisocyanates and hydrogenated xylylene diisocyanates, as the polyisocyanate component (d1) in the urethane resin particles (D') having a core-shell structure, is preferably used in the core section.

From the viewpoint of the finished appearance of the formed multilayer coating film and the storage stability of the water-based coating composition of the invention, the content ratio of the diisocyanate (d1-1) is preferably in the range of 10 to 90 mass %, more preferably in the range of 15 to 80 mass % and even more preferably in the range of 20 to 70 mass %, based on the total solid content of the polyisocyanate component (d1), in the urethane resin particles (D') having a core-shell structure.

The polyol component (d2) of the urethane resin particles (D') having a core-shell structure preferably comprises the polyether polyol (d2-1) as the polyol component (I-d2) composing the core sections, and comprises the polycarbonate polyol (d2-2) as the polyol component (II-d2) composing the shell sections.

From the viewpoint of the storage stability of the water-based coating composition of the invention and the flexibility of the coated film, the content ratio of the polyether polyol (d2-1) and polycarbonate polyol (d2-2) in the polyol component (d2) of the urethane resin particles (D') having a core-shell structure is preferably 99/1 to 30/70, more preferably 95/5 to 50/50 and even more preferably 90/10 to 60/40, as the mass ratio of polyether polyol (d2-1)/polycarbonate polyol (d2-2).

The number-average molecular weight of the urethane resin particles (D') having a core-shell structure is preferably 2000 or higher, especially 5000 or higher and most especially 10,000 or higher, from the viewpoint of dispersibility, productivity, and performance of the coating film obtained by application to the coating composition.

A number-average molecular weight of 2000 or higher will result in satisfactory coating film performance.

From the viewpoint of dispersibility and storage stability, the urethane resin particles (D') having a core-shell structure may generally have a mean particle size in the range of 10 to 5000 nm, and preferably they have a mean particle size in the range of 10 to 1000 nm, more preferably a mean particle size in the range of 20 to 500 nm and most preferably a mean particle size in the range of 50 to 300 nm.

From the viewpoint of the aqueous dispersion stability and water resistance of the obtained coating film, the urethane resin particles (D') having a core-shell structure have an acid value of preferably 5 to 40 mgKOH/g, more preferably 5 to 30 mgKOH/g and even more preferably 10 to 30 mgKOH/g.

From the viewpoint of the water resistance of the obtained coating film, the urethane resin particles (D') having a core-shell structure have a hydroxyl value of preferably 0 to 100 mgKOH/g, more preferably 0 to 50 mgKOH/g and even more preferably 0 to 10 mgKOH/g.

The solid concentration of the urethane resin particles (D') having a core-shell structure in aqueous dispersion is preferably in the range of 20 to 50 mass % and more preferably in the range of 30 to 50 mass %. If the solid concentration is 50 mass % or lower then emulsification will be facilitated and it will be possible to more easily obtain an aqueous dispersion. If the solid concentration is 20 mass % or higher, the solvent component will be reduced and the solid content of the water-based coating composition can thus be increased.

From the viewpoint of the finished appearance of the multilayer coating film that is formed and the storage stability of the water-based coating composition of the invention, the content of the urethane resin particles (D') having a core-shell structure is preferably 1 to 50 mass %, more preferably 5 to 45 mass % and even more preferably 10 to 40 mass %, based on the resin solid content in the water-based coating composition.

While the reason why a multilayer coating film with excellent finished appearance is formed with the water-based coating composition of the invention is not completely understood, it is conjectured that the relatively high crystallinity of the urethane resin particles (D) in the water-based coating composition interferes with swelling of the first colored coating film by the solvent in the water-based second colored coating material and clear coating material, thus inhibiting microskin formation in the first colored coating film and layer mixing between the coated first colored coating film and second colored coating film, so that a multilayer coating film with an excellent finished appearance results.

Moreover, while the reason for the excellent storage stability of the water-based coating composition of the invention is not thoroughly understood, it is conjectured that the relatively high crystallinity of the urethane resin particles (D) inhibits swelling of the urethane resin particles (D) by the solvent in the water-based coating composition, thus reducing viscosity increase and resulting in excellent storage stability.

Other Components

If necessary, the water-based coating composition of the invention may also comprise a resin other than the acrylic resin (A), polyester resin (B), curing agent (C) and urethane resin particles (D), or a pigment, organic solvent, curing catalyst, dispersing agent, anti-settling agent, antifoaming agent, thickening agent, ultraviolet absorber, light stabilizer or surface control agent.

Examples of resins other than the acrylic resin (A), polyester resin (B), curing agent (C) and urethane resin particles (D) include polyurethane resins other than the urethane resin particles (D), polyolefin resins and epoxy resins.

The pigment used may be a color pigment, extender pigment or brightness pigment, for example. Such pigments may be used alone or in combinations of two or more.

When the water-based coating composition of the invention contains a pigment, the pigment content is preferably in the range of 1 to 200 parts by mass, more preferably in the range of 20 to 160 parts by mass and even more preferably in the range of 50 to 140 parts by mass, based on 100 parts by mass as the resin solid content of the water-based coating composition.

Examples for the color pigment include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments and diketopyrrolopyrrole-based pigments. Titanium oxide and carbon black are preferably used among these.

When the water-based coating composition of the invention contains a color pigment, the color pigment content is preferably in the range of 1 to 180 parts by mass, more preferably in the range of 5 to 150 parts by mass and even more preferably in the range of 15 to 130 parts by mass, based on 100 parts by mass as the resin solid content of the water-based coating composition.

Examples of extender pigments include barium sulfate, talc, clay, kaolin, barium carbonate, calcium carbonate, silica and alumina white. The extender pigment used is preferably barium sulfate or talc from the viewpoint of coating stability and finished appearance.

When the water-based coating composition of the invention contains an extender pigment, the extender pigment content is preferably in the range of 1 to 180 parts by mass, more preferably in the range of 5 to 140 parts by mass and even more preferably in the range of 10 to 120 parts by mass, based on 100 parts by mass as the resin solid content of the water-based coating composition.

Examples of brightness pigments include aluminum (including vapor deposited aluminum), copper, zinc, brass, nickel, glass flakes, aluminum oxide, mica, titanium oxide- and/or iron oxide-coated aluminum oxide, and titanium oxide- and/or iron oxide-coated mica. Use of an aluminum pigment is preferred. Aluminum pigments include non-leafing aluminum pigments and leafing aluminum pigments, either of which may be used.

The brightness pigment is preferably flaky. The brightness pigment preferably has a dimension in the lengthwise direction in the range of generally 1 to 100 μm and especially 5 to 40 μm, and a thickness in the range of generally 0.001 to 5 μm and especially 0.01 to 2 μm.

When the water-based coating composition of the invention contains a brightness pigment, the brightness pigment content is preferably in the range of 0.1 to 100 parts by mass, more preferably in the range of 1 to 50 parts by mass and even more preferably in the range of 3 to 25 parts by mass, based on 100 parts by mass as the resin solid content of the water-based coating composition.

Examples of organic solvents include ketone-based solvents such as acetone, methyl ethyl ketone and methyl isobutyl ketone; ester-based solvents such as ethyl acetate, butyl acetate, methyl benzoate, ethyl ethoxypropionate, ethyl propionate and methyl propionate; alcohol-based solvents such as isopropanol, n-butanol, isobutanol and 2-ethylhexanol; ether-based solvents such as tetrahydrofuran, dioxane and dimethoxyethane; glycol ether-based solvents such as ethyleneglycol monomethyl ether, ethyleneglycol monoethyl ether, diethyleneglycol monomethyl ether, propyleneglycol monomethyl ether acetate and 3-methoxybutyl acetate; and aromatic hydrocarbon-based solvents and aliphatic hydrocarbon-based solvents.

For use, the water-based coating composition may be applied after adding water and/or an organic solvent for dilution to adjust it to the appropriate viscosity, as necessary.

The suitable viscosity will differ depending on the coating composition, and for example, when adjusted using a No. 4

Ford cup viscometer, it may be a viscosity at 20° C. of usually about 20 to 70 seconds and preferably about 25 to 50 seconds.

The coating solid concentration of the water-based coating composition will usually be about 5 to 70 mass % and is preferably about 10 to 55 mass %.

The water-based coating composition may be either a one-component type coating material or a multi-component coating material, but it is preferably a one-component type coating material from the viewpoint of excellent productivity without a coating material mixing step, and of allowing maintenance of the coating machine to be simplified.

The water-based coating composition may be coated onto an article to be coated by a known method such as air spray coating, airless spray coating, rotary atomizing coating or curtain coating, for example, and electrostatic application may also be carried out during the coating. Methods of air spray coating and rotary atomizing coating are preferred among these. Such coating methods may be carried out once or several times, until the desired film thickness is obtained.

The coating amount of the water-based coating composition is usually preferred to be an amount that produces a cured film thickness of 5 to 40 μm, preferably 7 to 35 μm and more preferably 10 to 30 μm.

Method for Forming Multilayer Coating Film

The water-based coating composition of the invention is a water-based coating composition to be used as a water-based first colored coating material (X) in a method for forming a multilayer coating film in which the following steps (1) to (4) are carried out in order:

step (1): a step of applying the water-based first colored coating material (X) onto an article to be coated to form a first colored coating film, step (2): a step of applying a water-based second colored coating material (Y) onto the first colored coating film formed in step (1) to form a second colored coating film, step (3): a step of applying a clear coating material (Z) onto the second colored coating film formed in step (2) to form a clear coating film, and step (4): a step of heat curing the first colored coating film, second colored coating film and clear coating film formed in steps (1) to (3) all at once.

The present invention therefore encompasses a method for forming a multilayer coating film in which the following steps (1) to (4) are carried out in order:

step (1): a step of applying a water-based first colored coating material (X) to form a first colored coating film, step (2): a step of applying a water-based second colored coating material (Y) onto the first colored coating film formed in step (1) to form a second colored coating film, step (3): a step of applying a clear coating material (Z) onto the second colored coating film formed in step (2) to form a clear coating film, and step (4): a step of heat curing the first colored coating film, second colored coating film and clear coating film formed in steps (1) to (3) all at once, wherein the water-based first colored coating material (X) is a water-based coating composition of the invention.

Article to be Coated

There are no particular restrictions on articles to be coated by application of the water-based coating composition of the invention, and examples include external plates of automobile bodies of passenger vehicles, trucks, motorcycles and buses; automobile parts; and external plates of consumer electric products such as cellular phones or audio devices, among which external plates of automobile bodies and automobile parts are preferred.

The material of an article to be coated is also not particularly restricted, and examples include metal materials such as iron, aluminum, brass, copper, tin plate, stainless steel, galvanized steel and alloyed zinc (such as Zn—Al, Zn—Ni and Zn—Fe)-plated steel; resins such as polyethylene resins, polypropylene resins, acrylonitrile-butadiene-styrene (ABS) resins, polyamide resins, acrylic resins, vinylidene chloride resins, polycarbonate resins, polyurethane resins and epoxy resins, plastic materials such as various FRP materials; inorganic materials such as glass, cement and concrete; wood materials; and fiber materials (paper or fabrics), among which metal materials and plastic materials are preferred.

The article to be coated may be an article that is a metal material or has a metal surface, such as that of a car body that has been formed from it, which has been surface-treated by phosphate treatment, chromate treatment or complex oxide treatment. The article to be coated may also be one having an undercoat film of any of various electrodeposition coatings formed on the aforementioned metal base material, car body or the like, and most preferably it is a car body having an undercoat film formed by a cationic electrodeposition coating.

Step (1)

First, the water-based first colored coating material (X) is applied onto an article to be coated. The water-based first colored coating material (X) is a water-based coating composition of the invention as described above, and it is applied to form a first colored coating film.

Before applying the water-based second colored coating material (Y) described below, the first colored coating film may be subjected to preheating, air blowing and other processing under heating conditions that substantially do not cure the coating film. The temperature for preheating is preferably 40 to 100° C., more preferably 50 to 90° C. and even more preferably 60 to 80° C. The preheating time is preferably 30 seconds to 15 minutes, more preferably 1 to 10 minutes and even more preferably 2 to 5 minutes. Air blowing may also be carried out by blasting the coated surface of the article to be coated with heated air at a temperature of usually ordinary temperature or 25° C. to 80° C., for a period of 30 seconds to 15 minutes, for example.

Step (2)

In step (2), a water-based second colored coating material (Y) is applied onto the first colored coating film formed in step (1), to form a second colored coating film.

The water-based second colored coating material (Y) is generally for the purpose of imparting an excellent outer appearance to the article to be coated, and for example, it may be a coating material obtained by dissolving or dispersing a base resin such as an acrylic resin, polyester resin, alkyd resin, urethane resin or epoxy resin having a crosslinkable functional group such as a carboxyl or hydroxyl group, and a resin component comprising a curing agent such as the curing agent (C), together with a pigment and other additives, in water or a mixed solvent of water and an organic solvent. From the viewpoint of the outer appearance and water resistance of the obtained multilayer coating film, it is preferred to use a thermosetting water-based coating material comprising a hydroxyl group-containing resin as the base resin and the aforementioned melamine resin as the crosslinking agent.

The pigment used may be the aforementioned color pigment, extender pigment or brightness pigment, for example.

Examples for the color pigment include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments and diketopyrrolopyrrole-based pigments, which were mentioned above in explaining the water-based coating composition.

When the water-based second colored coating material (Y) contains a color pigment, the color pigment content is preferably in the range of 1 to 80 parts by mass, more preferably in the range of 1 to 70 parts by mass and even more preferably in the range of 1 to 50 parts by mass, based on 100 parts by mass as the resin solid content of the water-based second colored coating material (Y).

Examples of extender pigments include barium sulfate, talc, clay, kaolin, barium carbonate, calcium carbonate, silica and alumina white. The extender pigment used is preferably barium sulfate from the viewpoint of the design property.

When the water-based second colored coating material (Y) contains an extender pigment, the content of the extender pigment is suitably in the range of 50 parts by mass or less, preferably 3 to 50 parts by mass and more preferably 5 to 30 parts by mass, based on 100 parts by mass of the resin solid content in the water-based second colored coating material (Y).

Examples of brightness pigments include aluminum (including vapor deposited aluminum), copper, zinc, brass, nickel, glass flakes, aluminum oxide, mica, titanium oxide- and/or iron oxide-coated aluminum oxide, and titanium oxide- and/or iron oxide-coated mica. Use of an aluminum pigment is preferred. Aluminum pigments include non-leafing aluminum pigments and leafing aluminum pigments, either of which may be used.

The brightness pigment is preferably flaky. The brightness pigment preferably has a dimension in the lengthwise direction in the range of generally 1 to 100 μm and especially 5 to 40 μm, and a thickness in the range of generally 0.001 to 5 μm and especially 0.01 to 2 μm.

When the water-based second colored coating material (Y) contains a brightness pigment, the brightness pigment content is preferably in the range of 0.1 to 100 parts by mass, more preferably in the range of 1 to 60 parts by mass and even more preferably in the range of 3 to 40 parts by mass, based on 100 parts by mass as the resin solid content of the water-based second colored coating material (Y).

Examples of organic solvents include ketone-based solvents such as acetone, methyl ethyl ketone and methyl isobutyl ketone; ester-based solvents such as ethyl acetate, butyl acetate, methyl benzoate, ethyl ethoxypropionate, ethyl propionate and methyl propionate; alcohol-based solvents such as isopropanol, n-butanol, isobutanol and 2-ethylhexanol; ether-based solvents such as tetrahydrofuran, dioxane and dimethoxyethane; glycol ether-based solvents such as ethyleneglycol monomethyl ether, ethyleneglycol monoethyl ether, diethyleneglycol monomethyl ether, propyleneglycol monomethyl ether acetate and 3-methoxybutyl acetate; and aromatic hydrocarbon-based solvents and aliphatic hydrocarbon-based solvents, any of which may be used alone or in combinations of two or more.

From the viewpoint of productivity and storage stability of the coating material, the organic solvent is preferably one containing a hydrophilic solvent as at least one type.

The hydrophilic solvent used is preferably an organic solvent having a mass of at least 20 g dissolving in 100 g of water at 20° C. Examples of such hydrophilic solvents include alcohol-based solvents such as methanol, ethanol and isopropanol; ether-based solvents such as dioxane and tetrahydrofuran; ethylene glycol ether-based solvents such as ethyleneglycol monomethyl ether, ethyleneglycol monoethyl ether, ethyleneglycol mono-n-propyl ether, ethyleneglycol monoisopropyl ether, ethyleneglycol mono-n-butyl ether, ethyleneglycol monoisobutyl ether and ethyleneglycol mono-tert-butyl ether; diethylene glycol ether-based solvents such as diethyleneglycol monomethyl ether, diethyleneglycol monoethyl ether, diethyleneglycol mono-n-propyl ether, diethyleneglycol monoisopropyl ether, diethyleneglycol mono-n-butyl ether, diethyleneglycol monoisobutyl ether and diethyleneglycol mono-tert-butyl ether; propylene glycolether-based solvents such as propyleneglycol monomethyl ether, propyleneglycol monoethyl ether, propyleneglycol mono-n-propyl ether and propyleneglycol monoisopropyl ether; and dipropylene glycol ether-based solvents such as dipropyleneglycol monomethyl ether, dipropyleneglycol monoethyl ether, dipropyleneglycol mono-n-propyl ether and dipropyleneglycol monoisopropyl ether, using any one of them alone or using them in combinations of two or more. Among these it is preferred to use an ethylene glycol ether-based solvent, from the viewpoint of storage stability of the coating material and finished appearance of the resulting multilayer coating film.

When the water-based second colored coating material (Y) contains a hydrophilic solvent, its content is preferably in the range of 2 to 70 parts by mass, more preferably in the range of 5 to 50 parts by mass and even more preferably in the range of 10 to 30 parts by mass, based on 100 parts by mass as the resin solid content of the water-based second colored coating material (Y).

The water-based second colored coating material (Y) may further contain, as necessary, common coating material additives such as curing catalysts, thickening agents, ultraviolet absorbers, light stabilizers, antifoaming agents, plasticizers, organic solvents, surface control agents and antisettling agents. These coating material additives may be used either alone or in combinations of two or more.

For use, the water-based second colored coating material (Y) may be applied after adding water and/or an organic solvent for dilution to adjust it to the appropriate viscosity, as necessary.

The suitable viscosity will differ depending on the coating composition, and for example, when adjusted using a No. 4 Ford cup viscometer, it may be a viscosity at 20° C. of usually about 20 to 80 seconds and preferably about 25 to 50 seconds. The coating solid concentration of the water-based second colored coating material (Y) will usually be about 5 to 50 mass % and is preferably about 10 to 40 mass %.

The water-based second colored coating material (Y) may be either a one-component type coating material or a multi-component coating material, but it is preferably a one-component type coating material from the viewpoint of excellent productivity without a coating material mixing step, and of allowing maintenance of the coating machine to be simplified.

The water-based second colored coating material (Y) may be coated onto an article to be coated by a known method such as air spray coating, airless spray coating, rotary atomizing coating or curtain coating, for example, and electrostatic application may also be carried out during the coating. Methods of air spray coating and rotary atomizing coating are preferred among these. Such coating methods may be carried out once or several times, until the desired film thickness is obtained.

The coating amount of the water-based second colored coating material (Y) is usually preferred to be an amount that produces a cured film thickness of 5 to 30 μm, preferably 7 to 25 μm and more preferably 10 to 20 μm.

Before applying the clear coating material (Z) described below, the second colored coating film may be subjected to preheating, air blowing and other processing under heating conditions that substantially do not cure the coating film. The temperature for preheating is preferably 40 to 100° C., more preferably 50 to 90° C. and even more preferably 60 to 80° C. The preheating time is preferably 30 seconds to 15 minutes, more preferably 1 to 10 minutes and even more preferably 2 to 5 minutes. Air blowing may also be carried out by blasting the coated surface of the article to be coated with heated air at a temperature of usually ordinary temperature or 25° C. to 80° C., for a period of 30 seconds to 15 minutes, for example.

Step (3)

In step (3), a clear coating material (Z) is applied onto the second colored coating film formed in step (2), to form a clear coating film.

The clear coating material (Z) may be any thermosetting clear coating material composition that is known for coating onto automobile bodies and the like. The thermosetting clear coating material composition may be, for example, an organic solvent-type thermosetting coating composition, an aqueous thermosetting coating composition or a powder thermosetting coating composition, containing a base resin with a crosslinkable functional group, and a curing agent.

Examples of crosslinkable functional groups in the base resin include carboxyl, hydroxyl, epoxy and silanol groups. Examples of types of resins for the base resin include acrylic resins, polyester resins, alkyd resins, urethane resins, epoxy resins and fluorine resins. Examples for the curing agent include polyisocyanate compounds, blocked polyisocyanate compounds, melamine resins, urea resins, carboxyl group-containing compounds, carboxyl group-containing resins, epoxy group-containing resins and epoxy group-containing compounds.

Preferred base resin/curing agent combinations for the clear coating material (Z) include carboxyl group-containing resin/epoxy group-containing resins, hydroxyl group-containing resin/polyisocyanate compounds, hydroxyl group-containing resin/blocked polyisocyanate compounds and hydroxyl group-containing resin/melamine resin combinations.

The clear coating material (Z) may be a one-component type coating material, or a multi-component coating material such as a two-component urethane resin coating material.

The clear coating material (Z) may also contain, as necessary, color pigments, brightness pigments and/or dyes in ranges that do not impair the transparency, and may further contain, as suitable, extender pigments, ultraviolet absorbers, light stabilizers, antifoaming agents, thickening agents, rust-preventive agents, surface control agents and the like.

The method of applying the clear coating material (Z) is not particularly restricted, and for example, a wet coating film may be formed by a method such as air spray coating, airless spray coating, rotary atomizing coating or curtain coating. An electrostatic charge may also be applied if necessary in these coating methods. Air spray coating and rotary atomizing coating are especially preferred. The coating amount of the clear coating material (Z) is usually preferred to be an amount that produces a cured film thickness of 10 to 50 μm and preferably 20 to 40 μm.

When carrying out air spray coating, airless spray coating or rotary atomizing coating, the viscosity of the clear coating material (Z) is preferably adjusted as appropriate using an organic solvent or other solvent to within a suitable viscosity range for coating, which will usually be a viscosity range of about 15 to 60 seconds and especially 20 to 50 seconds at 20° C., as measured with a No. 4 Ford cup viscometer.

Step (4)

In the method for forming a multilayer coating film of the invention, the uncured first colored coating film, the uncured second colored coating film and the uncured clear coating film formed in steps (1) to (3) described above are simultaneously heat cured.

Curing of the first colored coating film, second colored coating film and clear coating film can be carried out by common coating film baking means, such as hot air heating, infrared heating or high-frequency heating. The heating temperature is preferably 60 to 180° C., more preferably 70 to 170° C. and even more preferably 80 to 160° C. The heating time is preferably 10 to 90 minutes and more preferably 15 to 60 minutes. Heating allows simultaneous curing of a multilayer coating film comprising three layers: the first colored coating film, the second colored coating film and the uncured clear coating film.

EXAMPLES

The present invention will now be explained in greater detail using production examples, examples and comparative examples. The production examples, examples and comparative examples are merely for illustration and are not intended to limit the scope of the invention. Throughout the production examples, examples and comparative examples, the "parts" and "%" values are based on mass, unless otherwise specified. The film thicknesses of the coating films are based on the cured coating films.

Production of Acrylic Resin (A)

Production of Hydroxyl Group-Containing Acrylic Resin (A1)

Production Example 1

In a reactor equipped with a thermometer, thermostat, stirrer, reflux condenser and dropper there were charged 70.7 parts of deionized water and 0.52 part of AQUALON KH-10 (trade name of Dai-ichi Kogyo Seiyaku Co., Ltd., emulsifying agent, 97% active ingredient), and then the mixture was stirred under a nitrogen stream and the temperature was increased to 80° C. Next, 1% of the total monomer emulsion described below and 5 parts of a 6% ammonium persulfate aqueous solution were introduced into the reactor, and the mixture was kept at 80° C. for 15 minutes. The remainder of the monomer emulsion was then added dropwise into the reactor kept at the same temperature over a period of 3 hours, and upon completion of the dropwise addition the mixture was aged for 1 hour. Next, the mixture was cooled to 30° C. while gradually adding 40 parts of a 5% 2-(dimethylamino)ethanol aqueous solution to the reactor, and discharged while filtering with a 100 mesh nylon cloth, to obtain a hydroxyl group-containing acrylic resin emulsion (A1-1) with a solid concentration of 45%. The hydroxyl value of the obtained hydroxyl group-containing acrylic resin was 43 mgKOH/g and the acid value was 12 mgKOH/g.

Monomer emulsion: 50 parts of deionized water, 10 parts of styrene, 40 parts of methyl methacrylate, 35 parts of ethyl acrylate, 3.5 parts of n-butyl methacrylate, 10 parts of 2-hydroxyethyl methacrylate, 1.5 parts of acrylic acid, 1.0 part of "AQUALON KH-10" and 0.03 part of ammonium persulfate were mixed and stirred to obtain a monomer emulsion.

Production of Polyester Resin (B)

Production of Hydroxyl Group-Containing Polyester Resin (B1)

Production Example 2

After charging 174 parts of trimethylolpropane, 327 parts of neopentyl glycol, 352 parts of adipic acid, 109 parts of isophthalic acid and 101 parts of 1,2-cyclohexanedicarboxylic anhydride into a reactor equipped with a thermometer, thermostat, stirrer, reflux condenser and water separator, the mixture was increased in temperature from 160° C. to 230° C. over a period of 3 hours. It was then kept at 230° C. while distilling off the generated condensation water using a water separator, and reaction was carried out to an acid value of 3 mgKOH/g or lower. Next, 59 parts of trimellitic anhydride was added to the reaction product and addition reaction was conducted for 30 minutes at 170° C., after which the mixture was cooled to 50° C. or lower. After then adding 2-(dimethylamino)ethanol in an equivalent amount with respect to the acid groups for neutralization, deionized water was gradually added to obtain a hydroxyl group-containing polyester resin solution (B1-1) at pH 7.2 with a solid concentration of 45%. The hydroxyl value of the obtained hydroxyl group-containing polyester resin was 128 mgKOH/g, the acid value was 35 mgKOH/g and the weight-average molecular weight was 13,000.

Production of Urethane Resin Particles (D)

Production Example 3

After charging 225.0 parts of "PTMG1000" (trade name of Mitsubishi Chemical Corp., polytetramethylene ether glycol with a number-average molecular weight of 1000), 111.0 parts of "ETERNACOLL UH-100" (trade name of Ube Industries, Ltd., polycarbonate diol with a number-average molecular weight of 1000), 0.9 part of cyclohexanedimethanol, 16.3 parts of dimethylolpropionic acid and 290 parts of methyl ethyl ketone into a reactor equipped with a thermometer, thermostat, stirrer, reflux condenser and water separator, the mixture was increased in temperature to 70° C. while stirring. Next, 98.5 parts of "TAKENATE 500" (trade name of Mitsui Chemicals, Inc., xylylene diisocyanate) was added dropwise over a period of 30 minutes, and the mixture was kept at 70° C. while continuing stirring, to obtain an NCO-terminal prepolymer with a free isocyanate group content of 8.0%. The obtained reaction product was cooled to 30° C., and 6.5 parts of dimethylethanolamine and 761.5 parts of deionized water were added for emulsification. After then adding 74.1 parts of a 5% aqueous solution of diethylenetriamine, the mixture was stirred for 120 minutes while conducting chain extension reaction. The methyl ethyl ketone was distilled off while heating under reduced pressure, and the concentration was adjusted with deionized water to obtain a urethane resin particle dispersion (D-1) with a solid content of 35%, an acid value of 15 mgKOH/g and a mean particle size of 145 nm. The polyether polyol/polycarbonate polyol mass ratio of the urethane resin particle dispersion (D-1) was 67/33.

Production Examples 4 to 17

Urethane resin particle dispersions (D-2) to (D-15) were obtained in the same manner as Production Example 3, except that the composition in Production Example 3 was as listed in Table 1-1 and Table 1-2 below.

TABLE 1-1

| Production Example | | | 3 | 4 | 5 | 6 | 7 | 8 | 9 | 10 |
|---|---|---|---|---|---|---|---|---|---|---|
| Urethane resin particle dispersion | | | D-1 | D-2 | D-3 | D-4 | D-5 | D-6 | D-7 | D-8 |
| Poly-isocyanate component | At least one type of diisocyanate (d1) selected from among xylylene diisocyanates and hydrogenated xylylene diisocyanates | TAKENAIE 500 | 98.5 | 69.6 | 73.0 | 62.4 | 49.4 | 35.3 | 21.2 | 58.8 |
| | | TAKENAIE 600 (*1) | | | | | | | | |
| | | FORTIMO (*2) | | | | | | | | |
| | Diisocyanate other than (d1) | HMDI (*3) | | | | | 18.9 | 31.5 | 44.1 | |
| | | IPDI (*4) | | | | | | | | |
| | | Hydrogenated MDI (*5) | | | | | | | | |
| Polyol component | Polyether polyol | PTMG1000 | 225.0 | | | | | | | |
| | | PTMG2000 (*6) | | 244.8 | | | 248.0 | 248.0 | 248.0 | |
| | | PTMG3000 (*7) | | | 241.2 | 252.0 | | | | 252.0 |
| | Polycarbonate polyol | ETERNACOLL UH-100 | 111.0 | | 120.0 | | | | | |
| | | ETERNACOLL UH-200 (*8) | | 120.0 | | 120.0 | 124.0 | 124.0 | 124.0 | |
| | | ETERNACOLL UH-300 (*9) | | | | | | | | 123.3 |
| | Other polyol | Cyclohexane-dimethanol | 0.9 | 0.9 | 0.9 | 0.9 | 0.9 | 0.9 | 0.9 | 0.9 |
| | | Dimethylol-propionic acid | 16.3 | 16.3 | 16.3 | 16.3 | 16.2 | 16.2 | 16.2 | 16.3 |
| Polyether polyol/polycarbonate polyol mass ratio | | | 67/33 | 67/33 | 67/33 | 68/32 | 67/33 | 67/33 | 67/33 | 67/33 |
| Dimethylethanolamine | | | 6.5 | 6.5 | 6.5 | 6.5 | 6.5 | 6.5 | 6.5 | 6.5 |
| Diethylenetriamine | | | 3.7 | 3.7 | 3.7 | 3.7 | 3.1 | 3.1 | 3.1 | 3.7 |
| Characteristic values | Solid content (%) | | 35 | 35 | 35 | 35 | 35 | 35 | 35 | 35 |
| | Acid value (mgKOH/g) | | 15 | 15 | 15 | 15 | 15 | 15 | 15 | 15 |
| | Mean particle size (nm) | | 145 | 131 | 115 | 85 | 90 | 108 | 125 | 81 |

TABLE 1-2

| | | Production Example | 11 | 12 | 13 | 14 | 15 | 16 | 17 |
|---|---|---|---|---|---|---|---|---|---|
| Urethane resin particle dispersion | | | D-9 | D-10 | D-11 | D-12 | D-13 | D-14 | D-15 |
| Poly-isocyanate component | At least one type of diisocyanate (d1) selected from among xylylene diisocyanates and hydrogenated xylylene diisocyanates | TAKENATE 500 | 63.7 | 59.9 | | | | | |
| | | TAKENATE 600 (*1) | | | 64.5 | | | | |
| | | FORTIMO (*2) | | | | 64.5 | | | |
| | Diisocyanate other than (d1) | HMDI (*3) | | | | | 56.3 | | |
| | | IPDI (*4) | | | | | | 72.7 | |
| | | Hydrogenated MDI (*5) | | | | | | | 84.7 |
| Polyol component | Polyether polyol | PTMG1000 | | | | | | | |
| | | PTMG2000 (*6) | | | | | | | |
| | | PTMG3000 (*7) | 201.6 | 338.4 | 252.0 | 252.0 | 252.0 | 243.0 | 235.8 |
| | Polycarbonate polyol | ETERNACOLL UH-100 | | | | | | | |
| | | ETERNACOLL UH-200 (*8) | 168.0 | 36.0 | 120.0 | 120.0 | 126.0 | 117.6 | 114.0 |
| | | ETERNACOLL UH-300 (*9) | | | | | | | |
| | Other polyol | Cyclohexane-dimethanol | 0.9 | 0.9 | 0.9 | 0.9 | 0.9 | 0.9 | 0.9 |
| | | Dimethylol-propionic acid | 16.3 | 16.3 | 16.4 | 16.4 | 16.3 | 16.3 | 16.3 |
| Polyether polyol/polycarbonate polyol mass ratio | | | 55/45 | 90/10 | 68/32 | 68/32 | 67/33 | 67/33 | 67/33 |
| Dimethylethanolamine | | | 6.5 | 6.5 | 6.5 | 6.5 | 6.5 | 6.5 | 6.5 |
| Diethylenetriamine | | | 3.7 | 3.7 | 3.7 | 3.7 | 3.7 | 3.7 | 3.7 |
| Characteristic values | Solid content (%) | | 35 | 35 | 35 | 35 | 35 | 35 | 35 |
| | Acid value (mgKOH/g) | | 15 | 15 | 15 | 15 | 15 | 15 | 15 |
| | Mean particle size (nm) | | 108 | 99 | 81 | 113 | 121 | 130 | 110 |

Notes (*1) to (*9) in the tables are as follows.

(*1) "TAKENATE 600": 1,3-Hydrogenated xylylene diisocyanate, trade name of Mitsui Chemicals, Inc.

(*2) "FORTIMO": 1,4-Hydrogenated xylylene diisocyanate, trade name of Mitsui Chemicals, Inc.

(*3) HMDI: Hexamethylene diisocyanate.

(*4) IPDI: Isophorone diisocyanate.

(*5) Hydrogenated MDI: Dicyclohexylmethane-4,4-diisocyanate.

(*6) "PTMG2000": Polytetramethylene ether glycol with number-average molecular weight of 2000, trade name of Mitsubishi Chemical Corp.

(*7) "PTMG3000": Polytetramethylene ether glycol with number-average molecular weight of 3000, trade name of Mitsubishi Chemical Corp.

(*8) "ETERNACOLL UH-200": Polycarbonate diol with number-average molecular weight of 2000, trade name of Ube Industries, Ltd.

(*9) "ETERNACOLL UH-300": Polycarbonate diol with number-average molecular weight of 3000, trade name of Ube Industries, Ltd.

Production of Urethane Resin Particles (D') Having a Core-Shell Structure

Production Example 18

After charging 39.0 parts of "PTMG1000" (trade name of Mitsubishi Chemical Corp., polytetramethylene ether glycol with a number-average molecular weight of 1000), 47.4 parts of "ETERNACOLL UH-100" (trade name of Ube Industries, Ltd., polycarbonate diol with a number-average molecular weight of 1000), 1.4 parts of cyclohexanedimethanol, 16.4 parts of dimethylolpropionic acid, 0.2 part of "NEOSTANN U-600" (trade name of Nitto-Kasei Co., bismuth-based catalyst) and 290 parts of methyl ethyl ketone, as the starting material for the shell sections, into a reactor equipped with a thermometer, thermostat, stirrer, reflux condenser and water separator, the mixture was increased in temperature to 80° C. while stirring. Next, 33.8 parts of isophorone diisocyanate and 1.6 parts of hydrogenated MDI were added and the mixture was kept at 80° C. while continuing stirring, to obtain an NCO-terminal prepolymer with a free isocyanate group content of 0.5%.

After further adding 246.0 parts of "PTMG1000" (trade name of Mitsubishi Chemical Corp., polytetramethylene ether glycol with a number-average molecular weight of 1000), 68.8 parts of "TAKENATE 500" trade name of Mitsui Chemicals, Inc., xylylene diisocyanate) and 280 parts of methyl ethyl ketone, as the starting material for the core sections, to the reaction product, it was stirred to obtain an NCO-terminal prepolymer with a free isocyanate group content of 7.9%. The obtained reaction product was cooled to 30° C., and 8.7 parts of dimethylethanolamine and 764.2 parts of deionized water were added for emulsification. After then adding 74.2 parts of a 5% aqueous solution of diethylenetriamine, the mixture was stirred for 120 minutes while conducting chain extension reaction. The methyl ethyl ketone was then distilled off while heating under reduced pressure, and the concentration was adjusted with deionized water to obtain a urethane resin particle dispersion (D'-1) having a core-shell structure with a solid content of 35%, an acid value of 15 mgKOH/g and a mean particle size of 149 nm. The polyether polyol/polycarbonate polyol mass ratio of the urethane resin particle dispersion (D'-1) with a core-shell structure was 86/14.

Production Examples 19 to 33

Urethane resin particle dispersions (D'-2) to (D'-16) were obtained in the same manner as Production Example 18, except that the composition in Production Example 18 was as listed in Table 2-1 and Table 2-2 below.

TABLE 2-1

| | | | Production Example | 18 | 19 | 20 | 21 | 22 | 23 | 24 | 25 |
|---|---|---|---|---|---|---|---|---|---|---|---|
| | Urethane resin particle dispersion | | | D'-1 | D'-2 | D'-3 | D'-4 | D'-5 | D'-6 | D'-7 | D'-8 |
| Shell section | Poly-isocyanate component | At least one type of diisocyanate (d1) selected from among xylylene diisocyanates and hydrogenated xylylene diisocyanates | TAKENATE 500 | | | | | | | | 19.9 |
| | | | TAKENATE 600 (*1) | | | | | | | | |
| | | | FORTIMO (*2) | | | | | | | | |
| | | Diisocyanate other than (d1) | HMDI (*3) | | | | | | | | |
| | | | IPDI (*4) | 33.8 | 25.2 | 23.3 | 23.7 | 24.9 | 24.9 | 24.9 | |
| | | | Hydrogenated MDI (*5) | 1.6 | 1.6 | 1.6 | 1.6 | 1.6 | 1.6 | 1.6 | 1.6 |
| | Polyol component | Polyether polyol | PTMG1000 | 39.0 | | | | | | | |
| | | | PTMG2000 (*6) | | 43.2 | 43.2 | | 35.6 | 35.6 | 35.6 | |
| | | | PTMG3000 (*7) | | | | 45.3 | | | | 45.0 |
| | | Polycarbonate polyol | ETERNACOLL UH-100 | 47.4 | | | | | | | |
| | | | ETERNACOLL UH-200 (*8) | | 51.6 | | 51.6 | 55.7 | 55.7 | 55.7 | 50.4 |
| | | | ETERNACOLL UH-300 (*9) | | | 52.2 | | | | | |
| | | Other polyol | Cyclohexanedimethanol | 1.4 | 1.4 | 1.4 | 1.4 | 1.4 | 1.4 | 1.4 | 1.4 |
| | | | Dimethylolpropionic acid | 16.4 | 16.4 | 16.4 | 16.4 | 16.5 | 16.5 | 16.5 | 16.3 |
| | NEOSTANN U-600 | | | 0.2 | 0.2 | 0.2 | 0.2 | 0.2 | 0.2 | 0.2 | 0.2 |
| Core section | Poly-isocyanate component | At least one type of diisocyanate (d1) selected from among xylylene diisocyanates and hydrogenated xylylene diisocyanates | TAKENATE 500 | 68.8 | 47.7 | 47.7 | 39.8 | 34.2 | 24.5 | 14.7 | |
| | | | TAKENATE 600 (*1) | | | | | | | | |
| | | | FORTIMO (*2) | | | | | | | | |
| | | Diisocyanate other than (d1) | IPDI (*4) | | | | | | | | 46.6 |
| | | | HMDI (*3) | | | | | 13.1 | 21.9 | 30.6 | |
| | Polyol component | Polyether polyol | PTMG1000 | 246.0 | | | | | | | |
| | | | PTMG2000 (*6) | | 267.6 | 267.6 | | 273.0 | 273.0 | 273.0 | |
| | | | PTMG3000 (*7) | | | | 275.4 | | | | 270.0 |
| | | Polycarbonate polyol | ETERNACOLL UH-100 | | | | | | | | |
| | | | ETERNACOLL UH-200 (*8) | | | | | | | | |
| | | | ETERNACOLL UH-300 (*9) | | | | | | | | |
| | Polyether polyol/polycarbonate polyol mass ratio | | | 86/14 | 86/14 | 86/14 | 86/14 | 85/15 | 85/15 | 85/15 | 86/14 |
| | Dimethy ethanolamine | | | 8.7 | 8.7 | 8.7 | 8.7 | 6.6 | 6.6 | 6.6 | 8.7 |
| | Diethylenetriamine | | | 3.7 | 3.7 | 3.7 | 3.7 | 2.3 | 2.3 | 2.3 | 3.7 |
| Characteristic values | Solid content (%) | | | 35.0 | 35.0 | 35.0 | 35.0 | 35.0 | 35.0 | 35.0 | 35.0 |
| | Acid value (mgKOH/g) | | | 15.0 | 15.0 | 15.0 | 15.0 | 15.0 | 15.0 | 15.0 | 15.0 |
| | Mean particle size (nm) | | | 149 | 125 | 104 | 85 | 90 | 100 | 110 | 105 |

TABLE 2-2

| | | | Production Example | 26 | 27 | 28 | 29 | 30 | 31 | 32 | 33 |
|---|---|---|---|---|---|---|---|---|---|---|---|
| | Urethane resin resin particle dispersion | | | D'-9 | D'-10 | D'-11 | D'-12 | D'-13 | D'-14 | D'-15 | D'-16 |
| Shell section | Poly-isocyanate component | At least one type of diisocyanate (d1) selected from among xylylene diisocyanates and hydrogenated xylylene diisocyanates | TAKENATE 500 | | | | | | | | |
| | | | TAKENATE 600 (*1) | | | | | | | | |
| | | | FORTIMO (*2) | | | | | | | | |
| | | Diisocyanate other than (d1) | HMDI (*3) | | | | | | 18.0 | | |
| | | | IPDI (*4) | 21.7 | 25.0 | 25.2 | 23.7 | 23.7 | | 23.4 | |
| | | | Hydrogenated MDI (*5) | 1.6 | 1.6 | 1.6 | 1.6 | 1.6 | 1.6 | 1.6 | 28.9 |
| | Polyol component | Polyether polyol | PTMG1000 | | | | | | | | |
| | | | PTMG2000 (*6) | | | | | | | | |
| | | | PTMG3000 (*7) | 46.8 | 1.8 | | 45.3 | 45.3 | 46.8 | 41.4 | 37.8 |
| | | Polycarbonate polyol | ETERNACOLL UH-100 | | | | | | | | |
| | | | ETERNACOLL UH-200 (*8) | | 92.4 | 94.8 | 51.6 | 51.6 | 51.6 | 51.6 | 51.6 |
| | | | ETERNACOLL UH-300 (*9) | 50.4 | | | | | | | |

TABLE 2-2-continued

| Production Example | | | | 26 | 27 | 28 | 29 | 30 | 31 | 32 | 33 |
|---|---|---|---|---|---|---|---|---|---|---|---|
| | | | Cyclohexanedimethanol | 1.4 | 1.4 | 1.4 | 1.4 | 1.4 | 1.4 | 1.4 | 1.4 |
| | | Other polyol | Dimethylolpropionic acid | 16.3 | 16.4 | 16.4 | 16.5 | 16.5 | 16.4 | 16.4 | 16.4 |
| | | NEOSTANN U-600 | | 0.2 | 0.2 | 0.2 | 0.2 | 0.2 | 0.2 | 0.2 | 0.2 |
| Core section | Polyisocyanate component | At least one type of diisocyanate (d1) selected from among xylylene diisocyanates and hydrogenated xylylene diisocyanates | TAKENATE 500 | 39.7 | 39.8 | 41.9 | | | | | |
| | | | TAKENATE 600 (*1) | | | | 41.1 | | | | |
| | | | FORTIMO (*2) | | | | | 41.1 | | | |
| | | Diisocyanate other than (d1) | IPDI (*4) | | | | | | 46.8 | 46.8 | 46.6 |
| | | | HMDI (*3) | | | | | | | | |
| | Polyol component | Polyether polyol | PTMG1000 | | | | | | | | |
| | | | PTMG2000 (*6) | 273.6 | 275.4 | 203.4 | 275.4 | 275.4 | 271.8 | 271.8 | 270.0 |
| | | | PTMG3000 (*7) | | | | | | | | |
| | | Polycarbonate polyol | ETERNACOLL UH-100 | | | | | | | | |
| | | | ETERNACOLL UH-200 (*8) | | | 69.6 | | | | | |
| | | | ETERNACOLL UH-300 (*9) | | | | | | | | |
| | Polyether polyol/polycarbonate polyol mass ratio | | | 86/14 | 75/25 | 55/45 | 86/14 | 86/14 | 86/14 | 86/14 | 86/14 |
| | Dimethylethanolamine | | | 8.7 | 8.7 | 8.7 | 8.8 | 8.8 | 8.7 | 8.7 | 8.7 |
| | Diethylenetriamine | | | 3.7 | 3.7 | 3.7 | 3.7 | 3.7 | 3.7 | 3.7 | 3.7 |
| Characteristic values | Solid content (%) | | | 35.0 | 35.0 | 35.0 | 35.0 | 35.0 | 35.0 | 35.0 | 35.0 |
| | Acid value (mgKOH/g) | | | 15.0 | 15.0 | 15.0 | 15.0 | 15.0 | 15.0 | 15.0 | 15.0 |
| | Mean particle size (nm) | | | 83 | 148 | 91 | 103 | 112 | 113 | 118 | 121 |

Production of Pigment Dispersions

Production Example 34

After mixing 33.3 parts of the hydroxyl group-containing acrylic resin solution (A1-1) obtained in Production Example 1 (15 parts solid content), 100 parts of "JR-806" (trade name of Tayca Corp., rutile titanium dioxide), 1 part of "carbon MA-100" (trade name of Mitsubishi Chemical Corp., carbon black) and 10 parts of deionized water, the pH was adjusted to 8.0 with 2-(dimethylamino)ethanol. Next, the obtained liquid mixture was placed in a wide-mouth glass bottle, glass beads of approximately 1.3 mmφ diameter were added as a dispersion medium, the bottle was sealed, and the mixture was dispersed for 30 minutes with a paint shaker to obtain a pigment dispersion (P-1).

Production Example 35

After mixing 37.5 parts of the hydroxyl group-containing polyester resin solution (B1-1) obtained in Production Example 2 (15 parts solid content), 100 parts of "JR-806" (trade name of Tayca Corp., rutile titanium dioxide), 1 part of "carbon MA-100" (trade name of Mitsubishi Chemical Corp., carbon black) and 10 parts of deionized water, the pH was adjusted to 8.0 with 2-(dimethylamino)ethanol. Next, the obtained liquid mixture was placed in a wide-mouth glass bottle, glass beads of approximately 1.3 mmφ diameter were added as a dispersion medium, the bottle was sealed, and the mixture was dispersed for 30 minutes with a paint shaker to obtain a pigment dispersion (P-2).

Production of Water-Based Coating Compositions

Example 1

There were uniformly mixed 144.3 parts of the pigment dispersion (P-1) obtained in Production Example 34, 55.6 parts of the hydroxyl group-containing polyester resin solution (B1-1) obtained in Production Example 2 (25 parts solid content), 71.4 parts of the urethane resin particle dispersion (D-1) obtained in Production Example 3 (30 parts solid content), 13.2 parts of "BAYHYDUR VPLS2310" (trade name of Sumika Bayer Urethane Co., Ltd., blocked polyisocyanate compound, solid content: 38%) (5 parts solid content), and 31.3 parts of "CYMEL 325" (trade name of Allnex, Japan, methyl/butyl-mixed etherified melamine resin, solid content: 80%) (25 parts solid content). To the obtained mixture there were then added "UH-752" (trade name of Adeka Corp., thickening agent), 2-(dimethylamino) ethanol and deionized water, to obtain water-based coating composition No. 1 having pH 8.0, a coating material solid content of 48%, and a viscosity of 30 seconds with a No. 4 Ford cup at 20° C.

Examples 2 to 33 and Comparative Examples 1 to 6

Water-based coating compositions No. 2 to 39, each having a viscosity of 30 seconds with a No. 4 Ford cup at 20° C., were obtained in the same manner as Example 1, except that the compositions were as listed in Table 3-1 to Table 3-4.

The storage stabilities of water-based coating compositions No. 1 to 39 were evaluated by the rate of change between the viscosity immediately after production and the viscosity after standing for 10 days at 40° C., based on the viscosity after 1 minute at 60 rpm measured using an "LVDV-I" (B type viscometer, trade name of Brookfield Co.).

$$\text{Viscosity change rate (\%)} = [(\text{Viscosity after standing for 10 days at 40° C.})/\text{viscosity immediately after production}) - 1] \times 100$$

Scores of VG and G are acceptable.

VG: viscosity change rate of <20%,

G: viscosity change rate of 20% and <50%,

P: viscosity change rate of 50%.

The storage stability results are shown together in Table 3-1 to Table 3-4.

TABLE 3-1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Water-based coating composition No. | | | 1 | 2 | 3 | 4 | 5 | 6 | 7 | 8 | 9 | 10 |
| Pigment dispersion | Pigment dispersion name | | P-1 | P-1 | P-1 | P-1 | P-1 | P-2 | P-1 | P-1 | P-1 | P-1 |
| | At least one type of resin selected from acrylic resin (A) and polyester resin (B) | Hydroxyl-containing acrylic resin emulsion (A1-1) | 15 | 15 | 15 | 15 | 15 | | 15 | 15 | 15 | 15 |
| | | Hydroxyl-containing polyester resin (B1-1) solution | | | | | | 15 | | | | |
| | Pigment | "JR-806" | 100 | 100 | 100 | 100 | 100 | 100 | 100 | 100 | 100 | 100 |
| | | "Carbon MA-100" | 1 | 1 | 1 | 1 | 1 | 1 | 1 | 1 | 1 | 1 |
| At least one type of resin selected from acrylic resin (A) and polyester resin (B) | | Hydroxyl-containing acrylic resin emulsion (A1-1) | | | | | 25 | | | | | |
| | | Hydroxyl-containing polyester resin (B1-1) solution | 25 | 25 | 25 | 25 | | 25 | 25 | 25 | 25 | 25 |
| Curing agent (C) | | "BAYHYDUR VPLS2310" | 5 | 5 | 5 | 5 | 5 | 5 | | 30 | 5 | 5 |
| | | "CYMEL 325" | 25 | 25 | 25 | 25 | 25 | 25 | 30 | | 25 | 25 |
| Urethane resin particles (D) | Urethane resin particle dispersion | D-1 | 30 | | | | | | | | | |
| | | D-2 | | 30 | | | | | | | | |
| | | D-3 | | | 30 | | | | | | | |
| | | D-4 | | | | 30 | 30 | 30 | 30 | 30 | | |
| | | D-5 | | | | | | | | | 30 | |
| | | D-6 | | | | | | | | | | 30 |
| | | D-7 | | | | | | | | | | |
| | | D-8 | | | | | | | | | | |
| | | D-9 | | | | | | | | | | |
| | | D-10 | | | | | | | | | | |
| | | D-11 | | | | | | | | | | |
| | | D-12 | | | | | | | | | | |
| | | D-13 | | | | | | | | | | |
| | | D-14 | | | | | | | | | | |
| | | D-15 | | | | | | | | | | |
| Storage stability | | | VG | VG | VG | VG | VG | G | VG | VG | VG | VG |

TABLE 3-2

| | | | Example | | | | | | Comparative Example | | |
|---|---|---|---|---|---|---|---|---|---|---|---|
| | | | 11 | 12 | 13 | 14 | 15 | 16 | 1 | 2 | 3 |
| Water-based coating composition No. | | | 11 | 12 | 13 | 14 | 15 | 16 | 17 | 18 | 19 |
| Pigment dispersion | Pigment dispersion name | | P-1 | P-1 | P-1 | P-1 | P-1 | P-1 | P-1 | P-1 | P-1 |
| | At least one type of resin selected from acrylic resin (A) and polyester resin (B) | Hydroxyl-containing acrylic resin emulsion (A1-1) | 15 | 15 | 15 | 15 | 15 | 15 | 15 | 15 | 15 |
| | | Hydroxyl-containing polyester resin (B1-1) solution | | | | | | | | | |
| | Pigment | "JR-806" | 100 | 100 | 100 | 100 | 100 | 100 | 100 | 100 | 100 |
| | | "Carbon MA-100" | 1 | 1 | 1 | 1 | 1 | 1 | 1 | 1 | 1 |
| At least one type of resin selected from acrylic resin (A) and polyester resin (B) | | Hydroxyl-containing acrylic resin emulsion (A1-1) | | | | | | | | | |
| | | Hydroxyl-containing polyester resin (B1-1) solution | 25 | 25 | 25 | 25 | 25 | 25 | 25 | 25 | 25 |
| Curing agent (C) | | "BAYHYDUR VPLS2310" | 5 | 5 | 5 | 5 | 5 | 5 | 5 | 5 | 5 |
| | | "CYMEL 325" | 25 | 25 | 25 | 25 | 25 | 25 | 25 | 25 | 25 |
| Urethane resin particles (D) | Urethane resin particle dispersion | D-1 | | | | | | | | | |
| | | D-2 | | | | | | | | | |
| | | D-3 | | | | | | | | | |
| | | D-4 | | | | | | | | | |
| | | D-5 | | | | | | | | | |
| | | D-6 | | | | | | | | | |
| | | D-7 | 30 | | | | | | | | |
| | | D-8 | | 30 | | | | | | | |
| | | D-9 | | | 30 | | | | | | |
| | | D-10 | | | | 30 | | | | | |

TABLE 3-2-continued

| | Example 11 | 12 | 13 | 14 | 15 | 16 | Comparative Example 1 | 2 | 3 |
|---|---|---|---|---|---|---|---|---|---|
| D-11 | | | | | 30 | | | | |
| D-12 | | | | | | 30 | | | |
| D-13 | | | | | | | 30 | | |
| D-14 | | | | | | | | 30 | |
| D-15 | | | | | | | | | 30 |
| Storage stability | G | VG | VG | VG | VG | VG | P | P | P |

TABLE 3-3

| | | | | Example 17 | 18 | 19 | 20 | 21 | 22 | 23 | 24 | 25 | 26 |
|---|---|---|---|---|---|---|---|---|---|---|---|---|---|
| Coating composition No. | | | | 20 | 21 | 22 | 23 | 24 | 25 | 26 | 27 | 28 | 29 |
| Pigment dispersion | Pigment dispersion name | | | P-1 | P-1 | P-1 | P-1 | P-1 | P-2 | P-1 | P-1 | P-1 | P-1 |
| | At least one type of resin selected from acrylic resin (A) and polyester resin (B) | Hydroxyl-containing acrylic resin emulsion (A1-1) | | 15 | 15 | 15 | 15 | 15 | | 15 | 15 | 15 | 15 |
| | | Hydroxyl-containing polyester resin (B1-1) solution | | | | | | | 15 | | | | |
| | Pigment | "JR-806" | | 100 | 100 | 100 | 100 | 100 | 100 | 100 | 100 | 100 | 100 |
| | | "Carbon MA-100" | | 1 | 1 | 1 | 1 | 1 | 1 | 1 | 1 | 1 | 1 |
| At least one type of resin selected from acrylic resin (A) and polyester resin (B) | | Hydroxyl-containing acrylic resin emulsion (A1-1) | | | | | | 25 | | | | | |
| | | Hydroxyl-containing polyester resin (B1-1) solution | | 25 | 25 | 25 | 25 | | 25 | 25 | 25 | 25 | 25 |
| Curing agent (C) | | "BAYHYDUR VPLS2310" | | 5 | 5 | 5 | 5 | 5 | 5 | | 30 | 5 | 5 |
| | | "CYMEL 325" | | 25 | 25 | 25 | 25 | 25 | 25 | 30 | | 25 | 25 |
| Urethane resin particles (D) | Urethane resin particles (D') having a core-shell structure | Urethane resin particle dispersion | D'-1 | 30 | | | | | | | | | |
| | | | D'-2 | | 30 | | | | | | | | |
| | | | D'-3 | | | 30 | | | | | | | |
| | | | D'-4 | | | | 30 | 30 | 30 | 30 | 30 | | |
| | | | D'-5 | | | | | | | | | 30 | |
| | | | D'-6 | | | | | | | | | | 30 |
| | | | D'-7 | | | | | | | | | | |
| | | | D'-8 | | | | | | | | | | |
| | | | D'-9 | | | | | | | | | | |
| | | | D'-10 | | | | | | | | | | |
| | | | D'-11 | | | | | | | | | | |
| | | | D'-12 | | | | | | | | | | |
| | | | D'-13 | | | | | | | | | | |
| | | | D'-14 | | | | | | | | | | |
| | | | D'-15 | | | | | | | | | | |
| | | | D'-16 | | | | | | | | | | |
| Storage stability | | | | VG | VG | VG | VG | VG | G | VG | VG | VG | VG |

TABLE 3-4

| | | | Example 27 | 28 | 29 | 30 | 31 | 32 | 33 | Comparative Example 4 | 5 | 6 |
|---|---|---|---|---|---|---|---|---|---|---|---|---|
| Coating composition No. | | | 30 | 31 | 32 | 33 | 34 | 35 | 36 | 37 | 38 | 39 |
| Pigment dispersion | Pigment dispersion name | | P-1 | P-1 | P-1 | P-1 | P-1 | P-1 | P-1 | P-1 | P-1 | P-1 |
| | At least one type of resin selected from acrylic resin (A) and polyester resin (B) | Hydroxyl-containing acrylic resin emulsion (A1-1) | 15 | 15 | 15 | 15 | 15 | 15 | 15 | 15 | 15 | 15 |
| | | Hydroxyl-containing polyester resin (B1-1) solution | | | | | | | | | | |
| | Pigment | "JR-806" | 100 | 100 | 100 | 100 | 100 | 100 | 100 | 100 | 100 | 100 |
| | | "Carbon MA-100" | 1 | 1 | 1 | 1 | 1 | 1 | 1 | 1 | 1 | 1 |

TABLE 3-4-continued

| | | | | Example 27 | Example 28 | Example 29 | Example 30 | Example 31 | Example 32 | Example 33 | Comparative Example 4 | Comparative Example 5 | Comparative Example 6 |
|---|---|---|---|---|---|---|---|---|---|---|---|---|---|
| At least one type of resin selected from acrylic resin (A) and polyester resin (B) | | Hydroxyl-containing acrylic resin emulsion (A1-1) | | | | | | | | | | | |
| | | Hydroxyl-containing polyester resin (B1-1) solution | | 25 | 25 | 25 | 25 | 25 | 25 | 25 | 25 | 25 | 25 |
| Curing agent (C) | | "BAYHYDUR VPLS2310" | | 5 | 5 | 5 | 5 | 5 | 5 | 5 | 5 | 5 | 5 |
| | | "CYMEL 325" | | 25 | 25 | 25 | 25 | 25 | 25 | 25 | 25 | 25 | 25 |
| Urethane resin particles (D) | Urethane resin particles (D') having a core-shell structure | Urethane resin particle dispersion | D'-1 | | | | | | | | | | |
| | | | D'-2 | | | | | | | | | | |
| | | | D'-3 | | | | | | | | | | |
| | | | D'-4 | | | | | | | | | | |
| | | | D'-5 | | | | | | | | | | |
| | | | D'-6 | | | | | | | | | | |
| | | | D'-7 | 30 | | | | | | | | | |
| | | | D'-8 | | 30 | | | | | | | | |
| | | | D'-9 | | | 30 | | | | | | | |
| | | | D'-10 | | | | 30 | | | | | | |
| | | | D'-11 | | | | | 30 | | | | | |
| | | | D'-12 | | | | | | 30 | | | | |
| | | | D'-13 | | | | | | | 30 | | | |
| | | | D'-14 | | | | | | | | 30 | | |
| | | | D'-15 | | | | | | | | | 30 | |
| | | | D'-16 | | | | | | | | | | 30 |
| Storage stability | | | | VG | G | VG | VG | VG | VG | VG | P | P | P |

Production of Acrylic Resin for Water-Based Second Colored Coating Material (Y)

Production Example 36

In a reactor equipped with a thermometer, thermostat, stirrer, reflux condenser, nitrogen inlet tube and dropper there were charged 130 parts of deionized water and 0.52 part of "AQUALON KH-10" (trade name of Dai-ichi Kogyo Seiyaku Co., Ltd., emulsifying agent, active ingredient: 97%), and then the mixture was stirred in a nitrogen stream and the temperature was increased to 80° C. Next, 1% of the total monomer emulsion (1) described below and 5.3 parts of a 6% ammonium persulfate aqueous solution were introduced into the reactor, and the mixture was kept at 80° C. for 15 minutes. The remainder of the monomer emulsion (1) was then added dropwise into the reactor kept at the same temperature over a period of 3 hours, and upon completion of the dropwise addition the mixture was aged for 1 hour. Next, monomer emulsion (2) described below was added dropwise over a period of 1 hour, and after aging for 1 hour, the mixture was cooled to 30° C. while gradually adding 40 parts of a 5% dimethylethanolamine aqueous solution to the reactor, and discharged while filtering with a 100 mesh nylon cloth, to obtain an acrylic resin emulsion (AC-1) with a solid concentration of 30%. The obtained acrylic resin emulsion (AC-1) had an acid value of 33 mgKOH/g and a hydroxyl value of 25 mgKOH/g.

Monomer emulsion (1): 42 parts deionized water, 0.72 part "AQUALON KH-10", 2.1 parts methylenebisacrylamide, 2.8 parts styrene, 16.1 parts methyl methacrylate, 28 parts ethyl acrylate and 21 parts n-butyl acrylate were mixed and stirred to obtain monomer emulsion (1).

Monomer emulsion (2): 18 parts deionized water, 0.31 part "AQUALON KH-10", 0.03 part ammonium persulfate, 5.1 parts methacrylic acid, 5.1 parts 2-hydroxyethyl acrylate, 3 parts styrene, 6 parts methyl methacrylate, 1.8 parts ethyl acrylate and 9 parts n-butyl acrylate were mixed and stirred to obtain monomer emulsion (2).

Production of Polyester Resin for Water-Based Second Colored Coating Material (Y)

Production Example 37

After charging 109 parts of trimethylolpropane, 141 parts of 1,6-hexanediol, 126 parts of hexahydrophthalic anhydride and 120 parts of adipic acid into a reactor equipped with a thermometer, thermostat, stirrer, reflux condenser and water separator, and heating from 160° C. to 230° C. for a period of 3 hours, condensation reaction was conducted at 230° C. for 4 hours. Next, 38.3 parts of trimellitic anhydride was further added for addition of carboxyl groups to the obtained condensation reaction product, reaction was conducted at 170° C. for 30 minutes, and then dilution was performed with 2-ethyl-1-hexanol to obtain a polyester resin solution (PE-1) with a solid concentration of 70%. The obtained polyester resin had an acid value of 46 mgKOH/g, a hydroxyl value of 150 mgKOH/g, a solid concentration of 70% and a weight-average molecular weight of 6,400.

Production of Brightness Pigment Dispersion

Production Example 38

In a stirring and mixing container there were uniformly mixed 19 parts of the aluminum pigment paste "GX-180A" (trade name of Asahi Kasei Metals Co., Ltd., metal content: 74%) (14 parts solid content), 35 parts of 2-ethyl-1-hexanol, 8 parts of the phosphate group-containing resin solution described below and 0.2 part of 2-(dimethylamino)ethanol, to obtain brightness pigment dispersion (P-3).

Phosphate group-containing resin solution: After placing a mixed solvent of 27.5 parts of methoxypropanol and 27.5 parts of isobutanol in a reactor equipped with a thermometer, thermostat, stirrer, reflux condenser and dropper, and heating to 110° C., 121.5 parts of a mixture comprising 25 parts of styrene, 27.5 parts of n-butyl methacrylate, 20 parts of "Isostearyl acrylate" (trade name of Osaka Organic Chemical Industry, Ltd., branched higher alkyl acrylate), 7.5 parts of 4-hydroxybutyl acrylate, 15 parts of the phosphate group-containing polymerizable monomer described below, 12.5 parts of 2-methacryloyloxyethyl acid phosphate, 10 parts of isobutanol and 4 parts of t-butyl peroxyoctanoate were added to the mixed solvent over a period of 4 hours, and then a mixture of 0.5 part of t-butyl peroxyoctanoate and 20 parts of isopropanol was added dropwise over a period of 1 hour. The mixture was then aged while stirring for 1 hour to obtain a phosphate group-containing resin solution with a solid concentration of 50%. The acid value due to the phosphate groups of the resin was 83 mgKOH/g, the hydroxyl value was 29 mgKOH/g and the weight-average molecular weight was 10,000.

Phosphate group-containing polymerizable monomer: After placing 57.5 parts of monobutylphosphoric acid and 41 parts of isobutanol in a reactor equipped with a thermometer, thermostat, stirrer, reflux condenser and dropper and heating them to 90° C., 42.5 parts of glycidyl methacrylate was added dropwise over a period of 2 hours, and the mixture was further stirred and aged for 1 hour. Next, 59 parts of isopropanol was added to obtain a phosphate group-containing polymerizable monomer solution with a solid concentration of 50%. The acid value due to the phosphate groups in the obtained monomer was 285 mgKOH/g.

Production of Water-Based Second Colored Coating Material (Y)

Production Example 39

There were uniformly mixed 100 parts of the acrylic resin emulsion (AC-1) obtained in Production Example 36 (30 parts solid content), 30 parts of the polyester resin solution (PE-1) obtained in Production Example 37 (21 parts solid content), 62 parts of the brightness pigment dispersion (P-3) obtained in Production Example 38, 32.5 parts of "CYMEL 325" (trade name of Allnex, Japan, methyl/butyl-mixed etherified melamine resin, solid content: 80%) (26 parts solid content), 65 parts of "UCOAT UX-8100" (trade name of Sanyo Chemical Industries, Ltd., urethane emulsion, solid content: 35%) (23 parts solid content) and 15 parts of ethyleneglycol monobutyl ether, and there were further added "PRIMAL ASE-60" (trade name of Rohm & Haas, thickening agent), 2-(dimethylamino)ethanol and deionized water, to obtain a water-based second colored coating material (Y-1) having pH 8.0, a coating solid content of 25% and a viscosity of 40 seconds with a No. 4 Ford cup at 20° C.

(Fabrication of Article to be Coated for Testing)

A zinc phosphate-treated cold-rolled steel sheet was electrodeposited with a thermosetting epoxy resin-based cationic electrodeposition coating composition (trade name "ELECRON GT-10" by Kansai Paint Co., Ltd.) to a film thickness of 20 μm, and heated at 170° C. for 30 minutes for curing. An article to be coated with an electrodeposition coating formed on the steel sheet was thus fabricated.

(Fabrication of Test Sheets)

Example 34

Each test article to be coated was electrostatically coated with the water-based coating composition No. 1 obtained in Example 1 using a rotary atomizing electrostatic coater to a dry film thickness of 25 μm, and allowed to stand for 5 minutes. The water-based second colored coating material (Y-1) obtained in Production Example 39 was then electrostatically coated onto the uncured first colored coating film using a rotary atomizing electrostatic coater to a dry film thickness of 15 μm, and after being allowed to stand for 5 minutes, it was preheated at 80° C. for 3 minutes. The second colored coating film was then electrostatically coated with "MAGICRON KINO-1210" (trade name of Kansai Paint Co., Ltd., acrylic resin-based solvent-type overcoat clear coating material) to a dry film thickness of 35 μm, and allowed to stand for 7 minutes. It was then heated at 140° C. for 30 minutes to heat and cure the first colored coating film, second colored coating film and clear coating film, to prepare each test sheet.

Examples 35 to 66 and Comparative Examples 7 to 12

Test sheets were fabricated in the same manner as Example 34, except that the type of water-based coating composition used in Example 34 was changed as shown in Table 4.

Each of the obtained test sheets was evaluated by the following test methods. The evaluation results are shown in Table 4.

(Test Method)

Finished appearance: The smoothness of each test sheet was evaluated based on the Long Wave (LW) value measured with a "Wave Scan" (trade name of BYK Gardner), and the distinctness was evaluated based on the Wa value. A smaller LW value indicates higher smoothness of the coating surface, and a smaller Wa value indicates higher distinctness of the coating surface.

TABLE 4

| | | | Evaluation results Finished appearance | |
|---|---|---|---|---|
| | | Water-based coating composition No. | Smoothness (LW) | Distinctness (Wa) |
| Example | 34 | 1 | 7 | 18 |
| | 35 | 2 | 6 | 16 |
| | 36 | 3 | 6 | 17 |
| | 37 | 4 | 6 | 15 |
| | 38 | 5 | 6 | 16 |
| | 39 | 6 | 7 | 16 |
| | 40 | 7 | 7 | 16 |
| | 41 | 8 | 6 | 17 |
| | 42 | 9 | 6 | 16 |
| | 43 | 10 | 6 | 16 |
| | 44 | 11 | 7 | 18 |
| | 45 | 12 | 7 | 15 |
| | 46 | 13 | 6 | 16 |
| | 47 | 14 | 6 | 17 |
| | 48 | 15 | 7 | 17 |
| | 49 | 16 | 7 | 18 |
| | 50 | 20 | 5 | 17 |
| | 51 | 21 | 5 | 16 |
| | 52 | 22 | 6 | 15 |
| | 53 | 23 | 5 | 13 |
| | 54 | 24 | 6 | 13 |
| | 55 | 25 | 6 | 14 |
| | 56 | 26 | 5 | 14 |
| | 57 | 27 | 6 | 13 |
| | 58 | 28 | 5 | 13 |
| | 59 | 29 | 5 | 12 |
| | 60 | 30 | 5 | 13 |
| | 61 | 31 | 7 | 19 |
| | 62 | 32 | 6 | 13 |
| | 63 | 33 | 6 | 14 |
| | 64 | 34 | 6 | 15 |
| | 65 | 35 | 6 | 17 |
| | 66 | 36 | 7 | 16 |
| Comparative Example | 7 | 17 | 8 | 30 |
| | 8 | 18 | 8 | 32 |
| | 9 | 19 | 8 | 32 |

TABLE 4-continued

| | Water-based coating composition No. | Evaluation results Finished appearance Smoothness (LW) | Distinctness (Wa) |
|---|---|---|---|
| 10 | 37 | 8 | 28 |
| 11 | 38 | 8 | 30 |
| 12 | 39 | 9 | 32 |

The invention claimed is:

1. A water-based coating composition to be used as a water-based first colored coating material (X) in a method for forming a multilayer coating film in which the following steps (1) to (4) are carried out in order:

step (1): a step of applying the water-based first colored coating material (X) onto an article to be coated to form a first colored coating film, step (2): a step of applying a water-based second colored coating material (Y) onto the first colored coating film formed in step (1), to form a second colored coating film, step (3): a step of applying a clear coating material (Z) onto the second colored coating film formed in step (2) to form a clear coating film, and step (4): a step of heat curing the first colored coating film, the second colored coating film and the clear coating film formed in steps (1) to (3) all at once, wherein the water-based coating composition to be used as a water-based first colored coating material (X) comprises:

at least one type of resin selected from among acrylic resin (A) and polyester resin (B), a curing agent (C), and urethane resin particles (D) obtained from a constituent component including a polyisocyanate component (d1) comprising at least one type of diisocyanate (d1-1) selected from among xylylene diisocyanates and hydrogenated xylylene diisocyanates, and a polyol component (d2), wherein a content ratio of the diisocyanate (d1-1) in the polyisocyanate component (d1) of the urethane resin particles (D) is in a range of 20 to 100 mass %, based on a total solid content of the polyisocyanate component (d1), wherein the polyol component (d2) comprises a polyether polyol (d2-1) and a polycarbonate polyol (d2-2), and the content ratio of the polyether polyol (d2-1) and the polycarbonate polyol (d2-2) in the polyol component (d2) is 90/10 to 60/40, as the mass ratio of polyether polyol (d2-1)/polycarbonate polyol (d2-2).

2. The water-based coating composition according to claim 1, wherein the number-average molecular weight of the polyether polyol (d2-1) is 1600 to 4000.

3. The water-based coating composition according to claim 1, wherein the number-average molecular weight of the polycarbonate polyol (d2-2) is 1600 to 4000.

4. The water-based coating composition according to claim 1, wherein the urethane resin particles (D) are urethane resin particles (D') having a core-shell structure.

5. The water-based coating composition according to claim 4, wherein the polyisocyanate component (I-d1) composing the core sections of the urethane resin particles (D') having a core-shell structure comprises at least one type of diisocyanate (d1-1) selected from among xylylene diisocyanates and hydrogenated xylylene diisocyanates.

6. The water-based coating composition according to claim 4, wherein the polyol component (I-d2) composing the core sections of the urethane resin particles (D') having a core-shell structure comprises the polyether polyol (d2-1), and the polyol component (II-d2) composing the shell sections comprises the polycarbonate polyol (d2-2).

7. The water-based coating composition according to claim 1, wherein the content ratio of the diisocyanate (d1-1) in the polyisocyanate component (d1) of the urethane resin particles (D) is in the range of 50 to 100 mass %, based on the total solid content of the polyisocyanate component (d1).

8. A method for forming a multilayer coating film in which the following steps (1) to (4) are carried out in order:

step (1): a step of applying a water-based first colored coating material (X) onto an article to be coated to form a first colored coating film, step (2): a step of applying a water-based second colored coating material (Y) onto the first colored coating film formed in step (1), to form a second colored coating film, step (3): a step of applying a clear coating material (Z) onto the second colored coating film formed in step (2) to form a clear coating film, and step (4): a step of heat curing the first colored coating film, the second colored coating film and the clear coating film formed in steps (1) to (3) all at once, wherein the water-based first colored coating material (X) is a water-based coating composition comprising:

at least one type of resin selected from among acrylic resin (A) and polyester resin (B), a curing agent (C), and urethane resin particles (D) obtained from a constituent component including a polyisocyanate component (d1) comprising at least one type of diisocyanate (d1-1) selected from among xylylene diisocyanates and hydrogenated xylylene diisocyanates, and a polyol component (d2), wherein a content ratio of the diisocyanate (d1-1) in the polyisocyanate component (d1) of the urethane resin particles (D) is in a range of 20 to 100 mass %, based on a total solid content of the polyisocyanate component (d1), wherein the polyol component (d2) comprises a polyether polyol (d2-1) and a polycarbonate polyol (d2-2), and the content ratio of the polyether polyol (d2-1) and the polycarbonate polyol (d2-2) in the polyol component (d2) is 90/10 to 60/40, as the mass ratio of polyether polyol (d2-1)/polycarbonate polyol (d2-2).

9. The method for forming a multilayer coating film according to claim 8, wherein the number-average molecular weight of the polyether polyol (d2-1) is 1600 to 4000.

10. The method for forming a multilayer coating film according to claim 8, wherein the number-average molecular weight of the polycarbonate polyol (d2-2) is 1600 to 4000.

11. The method for forming a multilayer coating film according to claim 8, wherein the urethane resin particles (D) are urethane resin particles (D') having a core-shell structure.

12. The method for forming a multilayer coating film according to claim 11, wherein the polyisocyanate component (I-d1) composing the core sections of the urethane resin particles (D') having a core-shell structure comprises at least one type of diisocyanate (d1-1) selected from among xylylene diisocyanates and hydrogenated xylylene diisocyanates.

13. The method for forming a multilayer coating film according to claim 11, wherein the polyol component (I-d2) composing the core sections of the urethane resin particles (D') having a core-shell structure comprises the polyether polyol (d2-1), and the polyol component (II-d2) composing the shell sections comprises the polycarbonate polyol (d2-2).

14. The method for forming a multilayer coating film according to claim 8, wherein the content ratio of the diisocyanate (d1-1) in the polyisocyanate component (d1) of the urethane resin particles (D) is in the range of 50 to 100 mass %, based on the total solid content of the polyisocyanate component (d1).

* * * * *